US010374883B2

(12) United States Patent
Dickey

(10) Patent No.: US 10,374,883 B2
(45) Date of Patent: Aug. 6, 2019

(54) APPLICATION-BASED CONFIGURATION OF NETWORK DATA CAPTURE BY REMOTE CAPTURE AGENTS

(71) Applicant: Splunk Inc., San Francisco, CA (US)

(72) Inventor: Michael Dickey, Palo Alto, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 15/885,712

(22) Filed: Jan. 31, 2018

(65) Prior Publication Data

US 2018/0167276 A1  Jun. 14, 2018

Related U.S. Application Data

(63) Continuation of application No. 14/253,744, filed on Apr. 15, 2014, now Pat. No. 9,923,767.

(51) Int. Cl.
G06F 15/16 (2006.01)
H04L 12/24 (2006.01)

(52) U.S. Cl.
CPC ...... H04L 41/0816 (2013.01); H04L 41/0856 (2013.01)

(58) Field of Classification Search
USPC ........................................................ 709/217
See application file for complete search history.

(56) References Cited

U.S. PATENT DOCUMENTS

| 5,436,618 A | 7/1995 | Van Steenbrugge |
| 5,787,253 A | 7/1998 | McCreery et al. |
| 5,796,942 A | 8/1998 | Esbensen |
| 5,892,903 A | 4/1999 | Klaus |
| 5,920,711 A | 7/1999 | Seawright et al. |
| 5,983,270 A | 11/1999 | Abraham et al. |
| 6,044,401 A | 3/2000 | Harvey |
| 6,418,471 B1 | 7/2002 | Shelton et al. |
| 6,542,861 B1 | 4/2003 | Lyles, Jr. et al. |
| 6,584,501 B1 | 6/2003 | Cartsonis et al. |
| 6,587,969 B1 | 7/2003 | Weinberg et al. |
| 6,594,634 B1 | 7/2003 | Hampton et al. |

(Continued)

FOREIGN PATENT DOCUMENTS

WO   2011134739 A1   11/2011

OTHER PUBLICATIONS

Notice of allowance from U.S. Appl. No. 14/528,898 dated Nov. 28, 2016, 8 pages.

(Continued)

Primary Examiner — Alicia Baturay

(74) Attorney, Agent, or Firm — Nicholson De Vos Webster & Elliott LLP

(57) ABSTRACT

The disclosed embodiments provide a method and system for facilitating the processing of network data. During operation, the system obtains, at a remote capture agent, configuration information for the remote capture agent from a configuration server over a network. Next, the system uses the configuration information to configure the generation of event data from network packets at the remote capture agent. Upon receiving an update to the configuration information from the configuration server, the system uses the update to reconfigure the generation of the event data by the remote capture agent during runtime of the remote capture agent.

24 Claims, 13 Drawing Sheets

(56) References Cited

U.S. PATENT DOCUMENTS

| | | | |
|---|---|---|---|
| 6,748,343 B2 * | 6/2004 | Alexander | H04L 41/22 340/541 |
| 6,792,460 B2 | 9/2004 | Oulu et al. | |
| 6,810,494 B2 | 10/2004 | Weinberg et al. | |
| 6,892,167 B2 | 5/2005 | Polan et al. | |
| 6,898,556 B2 | 5/2005 | Smocha et al. | |
| 6,915,308 B1 | 7/2005 | Evans et al. | |
| 6,973,489 B1 | 12/2005 | Levy | |
| 6,985,944 B2 | 1/2006 | Aggarwal | |
| 6,988,141 B1 | 1/2006 | Motoyama et al. | |
| 7,016,813 B2 * | 3/2006 | Alexander | H04L 41/22 340/541 |
| 7,080,399 B1 | 7/2006 | Yanagawa et al. | |
| 7,100,091 B2 * | 8/2006 | Nakamoto | H04L 43/50 714/43 |
| 7,171,689 B2 * | 1/2007 | Beavers | G06F 11/0709 714/E11.025 |
| 7,177,441 B2 | 2/2007 | Condon et al. | |
| 7,197,559 B2 | 3/2007 | Goldstein et al. | |
| 7,219,138 B2 | 5/2007 | Straut et al. | |
| 7,228,348 B1 | 6/2007 | Farley et al. | |
| 7,228,564 B2 * | 6/2007 | Raikar | H04L 63/1408 726/11 |
| 7,231,445 B1 * | 6/2007 | Aweya | G06Q 10/00 709/219 |
| 7,246,101 B2 | 7/2007 | Fu et al. | |
| 7,246,162 B2 | 7/2007 | Tindal | |
| 7,257,719 B2 | 8/2007 | Pandit et al. | |
| 7,260,846 B2 | 8/2007 | Day | |
| 7,277,957 B2 | 10/2007 | Rowley et al. | |
| 7,299,277 B1 | 11/2007 | Moran et al. | |
| 7,376,896 B2 | 5/2008 | Ullmann et al. | |
| 7,380,272 B2 | 5/2008 | Sharp et al. | |
| 7,444,263 B2 | 10/2008 | White et al. | |
| 7,490,066 B2 * | 2/2009 | Kronenberg | H04L 41/069 705/50 |
| 7,519,964 B1 * | 4/2009 | Islam | G06F 8/44 717/177 |
| 7,543,051 B2 | 6/2009 | Greifeneder et al. | |
| 7,552,238 B2 * | 6/2009 | Gulland | G06F 15/177 709/220 |
| 7,577,623 B2 | 8/2009 | Genty et al. | |
| 7,594,011 B2 | 9/2009 | Chandra | |
| 7,594,269 B2 | 9/2009 | Durham et al. | |
| 7,607,170 B2 | 10/2009 | Chesla | |
| 7,610,344 B2 | 10/2009 | Mehr et al. | |
| 7,623,463 B2 | 11/2009 | Chavda | |
| 7,644,365 B2 * | 1/2010 | Bhattacharya | H04L 63/1416 715/733 |
| 7,644,438 B1 | 1/2010 | Dash et al. | |
| 7,650,396 B2 | 1/2010 | Tindal | |
| 7,650,634 B2 | 1/2010 | Zuk | |
| 7,660,892 B2 | 2/2010 | Choong et al. | |
| 7,702,806 B2 | 4/2010 | Gil et al. | |
| 7,729,240 B1 | 6/2010 | Crane et al. | |
| 7,735,063 B2 * | 6/2010 | Herzog | G06F 9/44505 717/121 |
| 7,738,396 B1 | 6/2010 | Turner et al. | |
| 7,751,393 B2 | 7/2010 | Chaskar et al. | |
| 7,761,918 B2 | 7/2010 | Gula et al. | |
| 7,774,369 B2 * | 8/2010 | Herzog | G06Q 40/12 707/793 |
| 7,797,443 B1 | 9/2010 | Pettigrew et al. | |
| RE41,903 E | 10/2010 | Wenig et al. | |
| 7,814,218 B1 | 10/2010 | Knee et al. | |
| 7,818,370 B2 * | 10/2010 | Piper | G06F 9/5061 709/203 |
| 7,836,498 B2 | 11/2010 | Poletto et al. | |
| 7,869,352 B1 | 1/2011 | Turner et al. | |
| 7,886,054 B1 | 2/2011 | Nag et al. | |
| 7,899,444 B2 | 3/2011 | Hans et al. | |
| 7,921,459 B2 * | 4/2011 | Houston | H04L 41/0604 709/223 |
| 7,948,889 B2 | 5/2011 | Lalonde et al. | |
| 7,953,425 B2 | 5/2011 | Jordan | |
| 7,954,109 B1 | 5/2011 | Durham et al. | |
| 7,962,616 B2 | 6/2011 | Kupferman et al. | |
| 7,979,555 B2 | 7/2011 | Rothstein et al. | |
| 8,019,064 B2 | 9/2011 | Bedingfield et al. | |
| 8,020,211 B2 | 9/2011 | Keanini et al. | |
| 8,032,564 B2 | 10/2011 | Muret et al. | |
| 8,037,175 B1 | 10/2011 | Apte et al. | |
| 8,042,055 B2 | 10/2011 | Wenig et al. | |
| 8,046,443 B2 * | 10/2011 | Parker | H04L 41/0806 709/203 |
| 8,056,130 B1 | 11/2011 | Njemanze et al. | |
| 8,064,350 B2 | 11/2011 | Peterman et al. | |
| 8,068,986 B1 | 11/2011 | Shahbazi et al. | |
| 8,095,640 B2 | 1/2012 | Guingo et al. | |
| 8,103,765 B2 | 1/2012 | Greifeneder et al. | |
| 8,122,006 B2 * | 2/2012 | de Castro Alves | G06F 16/2453 707/713 |
| 8,125,908 B2 | 2/2012 | Rothstein et al. | |
| 8,127,000 B2 | 2/2012 | Wenig et al. | |
| 8,140,665 B2 | 3/2012 | Malloy et al. | |
| 8,144,609 B2 | 3/2012 | Rao et al. | |
| 8,185,953 B2 | 5/2012 | Rothstein et al. | |
| 8,191,136 B2 | 5/2012 | Dudfield et al. | |
| 8,195,661 B2 | 6/2012 | Kalavade | |
| 8,248,958 B1 | 8/2012 | Tulasi et al. | |
| 8,255,511 B1 | 8/2012 | Moore et al. | |
| 8,266,271 B2 | 9/2012 | Oyadomari et al. | |
| 8,301,745 B1 | 10/2012 | Wohlgemuth et al. | |
| 8,335,848 B2 | 12/2012 | Wenig et al. | |
| 8,385,532 B1 | 2/2013 | Geist et al. | |
| 8,386,371 B2 | 2/2013 | Kittelsen et al. | |
| 8,386,598 B2 | 2/2013 | Robinson | |
| 8,387,076 B2 * | 2/2013 | Thatte | G06F 16/252 719/328 |
| 8,392,553 B2 * | 3/2013 | Petropoulakis | G06F 11/3006 709/224 |
| 8,423,894 B2 * | 4/2013 | Bhattacharya | H04L 63/1416 715/733 |
| 8,473,606 B2 * | 6/2013 | Kronenberg | H04L 41/069 709/221 |
| 8,473,620 B2 | 6/2013 | Demmer et al. | |
| 8,498,956 B2 * | 7/2013 | Srinivasan | G06K 9/62 706/45 |
| 8,522,219 B2 | 8/2013 | Schwarzbauer et al. | |
| 8,533,532 B2 | 9/2013 | Wenig et al. | |
| 8,543,534 B2 * | 9/2013 | Alves | G06F 9/541 707/600 |
| 8,549,650 B2 | 10/2013 | Hanson | |
| 8,583,772 B2 | 11/2013 | Wenig et al. | |
| 8,589,375 B2 | 11/2013 | Zhang et al. | |
| 8,589,436 B2 * | 11/2013 | Srinivasan | G06K 9/62 707/780 |
| 8,589,876 B1 | 11/2013 | Neeman | |
| 8,601,122 B2 | 12/2013 | Malloy et al. | |
| 8,676,841 B2 * | 3/2014 | Srinivasan | G06K 9/62 707/780 |
| 8,705,639 B2 * | 4/2014 | Salinger | H04N 19/80 375/259 |
| 8,779,921 B1 * | 7/2014 | Curtiss | G08B 25/009 340/506 |
| 8,782,787 B2 | 7/2014 | Willibeek-Lemair et al. | |
| 8,806,361 B1 | 8/2014 | Noel et al. | |
| 8,842,548 B2 | 9/2014 | Pleshek et al. | |
| 8,850,064 B2 | 9/2014 | Mann et al. | |
| 8,918,430 B2 | 12/2014 | Fischer | |
| 8,958,318 B1 | 2/2015 | Hastwell et al. | |
| 8,978,034 B1 * | 3/2015 | Goodson | G06F 9/5038 718/101 |
| 8,984,101 B1 * | 3/2015 | Viswanath | H04L 67/2842 709/220 |
| 9,043,439 B2 | 5/2015 | Bicket et al. | |
| 9,098,587 B2 * | 8/2015 | Deshmukh | G06F 16/20 |
| 9,110,101 B2 | 8/2015 | Pietrowicz et al. | |
| 9,112,915 B2 | 8/2015 | Su | |
| 9,189,449 B2 * | 11/2015 | Branson | G06F 15/80 |
| 9,244,978 B2 * | 1/2016 | Alves | G06F 16/903 |

(56) References Cited

U.S. PATENT DOCUMENTS

| | | | |
|---|---|---|---|
| 9,270,545 B2 * | 2/2016 | Salinger | H04N 19/80 |
| 9,305,238 B2 * | 4/2016 | Srinivasan | G06K 9/62 |
| 9,330,395 B2 * | 5/2016 | Hauser | G06Q 30/0201 |
| 9,405,854 B2 * | 8/2016 | Jerzak | G06F 16/9024 |
| 9,509,553 B2 * | 11/2016 | Levy | H04L 67/34 |
| 9,542,708 B2 * | 1/2017 | Piper | G06F 16/172 |
| 9,558,225 B2 * | 1/2017 | Skrzypczak | G06F 16/23 |
| 9,680,846 B2 * | 6/2017 | Haugsnes | G06F 16/24 |
| 9,762,443 B2 * | 9/2017 | Dickey | H04L 41/0856 |
| 9,923,767 B2 * | 3/2018 | Dickey | H04L 41/0816 |
| 2002/0015387 A1 | 2/2002 | Houh | |
| 2003/0061506 A1 | 3/2003 | Cooper et al. | |
| 2003/0101449 A1 | 5/2003 | Bentolila et al. | |
| 2003/0120619 A1 * | 6/2003 | Osborn | G06F 16/30 706/19 |
| 2003/0135612 A1 | 7/2003 | Huntington et al. | |
| 2003/0191599 A1 | 10/2003 | Bartsch | |
| 2003/0221000 A1 | 11/2003 | Cherkasova et al. | |
| 2004/0015579 A1 | 1/2004 | Cooper et al. | |
| 2004/0030796 A1 | 2/2004 | Cooper et al. | |
| 2004/0042470 A1 | 3/2004 | Cooper et al. | |
| 2004/0044912 A1 | 3/2004 | Connary et al. | |
| 2004/0088405 A1 | 5/2004 | Aggarwal | |
| 2004/0109453 A1 | 6/2004 | Wirth | |
| 2004/0152444 A1 | 8/2004 | Lialiamou et al. | |
| 2004/0215747 A1 * | 10/2004 | Maron | H04L 67/1095 709/220 |
| 2005/0021715 A1 | 1/2005 | Dugatkin et al. | |
| 2005/0060402 A1 | 3/2005 | Oyadomari et al. | |
| 2005/0120160 A1 | 6/2005 | Plouffe et al. | |
| 2005/0131876 A1 | 6/2005 | Ahuja et al. | |
| 2005/0138013 A1 | 6/2005 | Walker et al. | |
| 2005/0138426 A1 | 6/2005 | Styslinger | |
| 2005/0273593 A1 | 12/2005 | Seminaro et al. | |
| 2005/0278731 A1 | 12/2005 | Cameron et al. | |
| 2006/0047721 A1 * | 3/2006 | Narang | G06F 16/27 |
| 2006/0077895 A1 | 4/2006 | Wright | |
| 2006/0101101 A1 | 5/2006 | Pandit et al. | |
| 2006/0198318 A1 | 9/2006 | Schondelmayer et al. | |
| 2006/0242694 A1 * | 10/2006 | Gold | H04L 63/1441 726/13 |
| 2006/0256735 A1 | 11/2006 | Borowski | |
| 2006/0279628 A1 | 12/2006 | Fleming et al. | |
| 2007/0011309 A1 | 1/2007 | Brady et al. | |
| 2007/0033408 A1 | 2/2007 | Morten | |
| 2007/0043861 A1 | 2/2007 | Baron et al. | |
| 2007/0050846 A1 | 3/2007 | Xie et al. | |
| 2007/0067450 A1 | 3/2007 | Malloy et al. | |
| 2007/0076312 A1 | 4/2007 | Jordan | |
| 2007/0083644 A1 | 4/2007 | Miller et al. | |
| 2007/0106692 A1 | 5/2007 | Klein | |
| 2007/0121872 A1 | 5/2007 | Hans et al. | |
| 2007/0150584 A1 | 6/2007 | Srinivasan | |
| 2007/0156916 A1 | 7/2007 | Schiefer | |
| 2007/0208852 A1 | 9/2007 | Wexler et al. | |
| 2007/0260932 A1 | 11/2007 | Prichard et al. | |
| 2008/0056139 A1 | 3/2008 | Liaqat | |
| 2008/0082679 A1 | 4/2008 | Dobtchev | |
| 2008/0159146 A1 | 7/2008 | Claudatos et al. | |
| 2008/0209505 A1 | 8/2008 | Ghai et al. | |
| 2008/0259910 A1 | 10/2008 | Bodin et al. | |
| 2008/0281963 A1 | 11/2008 | Fletcher et al. | |
| 2009/0070786 A1 * | 3/2009 | Alves | G06F 9/541 719/318 |
| 2009/0129316 A1 | 5/2009 | Ramanathan et al. | |
| 2009/0228474 A1 | 9/2009 | Chiu et al. | |
| 2009/0238088 A1 | 9/2009 | Tan | |
| 2009/0271504 A1 * | 10/2009 | Ginter | G05B 23/0213 709/220 |
| 2009/0319247 A1 | 12/2009 | Ratcliffe, III et al. | |
| 2010/0031274 A1 | 2/2010 | Sim-Tang | |
| 2010/0064307 A1 | 3/2010 | Malhotra et al. | |
| 2010/0070929 A1 | 3/2010 | Behl et al. | |
| 2010/0095370 A1 | 4/2010 | Lee et al. | |
| 2010/0136943 A1 | 6/2010 | Hirvela et al. | |
| 2010/0153316 A1 | 6/2010 | Duffield et al. | |
| 2010/0318665 A1 * | 12/2010 | Demmer | H04L 41/12 709/227 |
| 2010/0318836 A1 * | 12/2010 | Ness | G06F 11/0709 714/4.1 |
| 2011/0026521 A1 | 2/2011 | Gamage et al. | |
| 2011/0029665 A1 | 2/2011 | Wenig et al. | |
| 2011/0106935 A1 | 5/2011 | Srinivasan | |
| 2011/0166982 A1 | 7/2011 | Cole et al. | |
| 2011/0178775 A1 | 7/2011 | Schoning et al. | |
| 2011/0231935 A1 | 9/2011 | Gula et al. | |
| 2011/0238723 A1 | 9/2011 | Weintraub et al. | |
| 2011/0246134 A1 | 10/2011 | Frishberg et al. | |
| 2011/0292818 A1 | 12/2011 | Zhytar et al. | |
| 2011/0296015 A1 | 12/2011 | Chakravarty et al. | |
| 2011/0302305 A1 | 12/2011 | Morimura et al. | |
| 2012/0017270 A1 | 1/2012 | Bartholomay et al. | |
| 2012/0054246 A1 | 3/2012 | Fischer | |
| 2012/0084437 A1 | 4/2012 | Wenig et al. | |
| 2012/0106354 A1 | 5/2012 | Pleshek et al. | |
| 2012/0158987 A1 | 6/2012 | Greifeneder et al. | |
| 2012/0173966 A1 | 7/2012 | Powell et al. | |
| 2012/0197934 A1 | 8/2012 | Zhang et al. | |
| 2012/0198047 A1 | 8/2012 | Steuer et al. | |
| 2012/0239681 A1 | 9/2012 | Zhang et al. | |
| 2012/0250610 A1 * | 10/2012 | Budampati | H04L 67/125 370/328 |
| 2012/0278455 A1 * | 11/2012 | Peng | H04L 67/104 709/220 |
| 2012/0314616 A1 * | 12/2012 | Hong | H04L 43/028 370/253 |
| 2013/0024431 A1 | 1/2013 | Parthasarathy et al. | |
| 2013/0067034 A1 | 3/2013 | Degioanni et al. | |
| 2013/0070622 A1 | 3/2013 | Degioanni et al. | |
| 2013/0080620 A1 | 3/2013 | Cook | |
| 2013/0091278 A1 | 4/2013 | Ludwig et al. | |
| 2013/0111011 A1 | 5/2013 | Moulhaud et al. | |
| 2013/0114456 A1 | 5/2013 | Dahod | |
| 2013/0128742 A1 | 5/2013 | Yu | |
| 2013/0132833 A1 | 5/2013 | White et al. | |
| 2013/0136253 A1 | 5/2013 | Liberman et al. | |
| 2013/0173782 A1 | 7/2013 | Ragutski et al. | |
| 2013/0179855 A1 | 7/2013 | Elliott | |
| 2013/0182700 A1 * | 7/2013 | Figura | H04L 43/08 370/352 |
| 2013/0198391 A1 | 8/2013 | Weissblum | |
| 2013/0212689 A1 | 8/2013 | Ben-Natan et al. | |
| 2013/0227689 A1 | 8/2013 | Pietrowicz et al. | |
| 2013/0232137 A1 | 9/2013 | Knott | |
| 2013/0246925 A1 | 9/2013 | Ahuja et al. | |
| 2013/0258995 A1 | 10/2013 | Skov et al. | |
| 2013/0276000 A1 | 10/2013 | Neeman | |
| 2013/0318236 A1 | 11/2013 | Coates et al. | |
| 2013/0318514 A1 | 11/2013 | Neeman | |
| 2013/0318536 A1 | 11/2013 | Fletcher et al. | |
| 2013/0318603 A1 | 11/2013 | Merza | |
| 2013/0318604 A1 | 11/2013 | Coates et al. | |
| 2013/0326620 A1 | 12/2013 | Merza et al. | |
| 2014/0012864 A1 * | 1/2014 | Nakagawa | G06F 16/24568 707/754 |
| 2014/0013309 A1 | 1/2014 | Gounares | |
| 2014/0046645 A1 | 2/2014 | White et al. | |
| 2014/0068102 A1 | 3/2014 | Mann et al. | |
| 2014/0173512 A1 | 6/2014 | Karpov et al. | |
| 2014/0201375 A1 | 7/2014 | Beereddy et al. | |
| 2014/0230062 A1 | 8/2014 | Kumaran | |
| 2014/0237292 A1 | 8/2014 | Chan | |
| 2014/0280737 A1 | 9/2014 | Bicket et al. | |
| 2014/0317228 A1 | 10/2014 | Dharmasanam | |
| 2014/0317684 A1 | 10/2014 | Porras et al. | |
| 2014/0325058 A1 | 10/2014 | Fletcher et al. | |
| 2014/0325363 A1 | 10/2014 | Fletcher et al. | |
| 2014/0328189 A1 * | 11/2014 | Fallon | H04L 67/2804 370/252 |
| 2014/0351415 A1 | 11/2014 | Harrigan et al. | |
| 2015/0013006 A1 | 1/2015 | Shulman et al. | |
| 2015/0062113 A1 | 3/2015 | Cannon et al. | |

(56) References Cited

U.S. PATENT DOCUMENTS

| | | | |
|---|---|---|---|
| 2015/0095359 A1 | 4/2015 | Duxbury | |
| 2015/0125807 A1 | 5/2015 | Shipley | |
| 2015/0156170 A1 | 6/2015 | Gurbani | |
| 2015/0178342 A1 | 6/2015 | Seering et al. | |
| 2015/0180891 A1 | 6/2015 | Seward et al. | |
| 2015/0295766 A1 | 10/2015 | Dickey et al. | |
| 2015/0319058 A1 | 11/2015 | Molinero et al. | |
| 2016/0028758 A1 | 1/2016 | Ellis et al. | |
| 2016/0127517 A1* | 5/2016 | Shcherbakov | H04L 67/10 709/217 |
| 2016/0155314 A1 | 6/2016 | Snyder | |
| 2016/0182283 A1 | 6/2016 | Mann et al. | |
| 2016/0323172 A1 | 11/2016 | Friend | |
| 2016/0330086 A1 | 11/2016 | Oda et al. | |
| 2017/0237634 A1* | 8/2017 | Dickey | H04L 41/0856 709/221 |

OTHER PUBLICATIONS

Notice of Allowance from U.S. Appl. No. 14/528,898, dated Sep. 13, 2017, 22 pages.
Notice of Allowance from U.S. Appl. No. 14/528,918 dated Aug. 18, 2016, 5 pages.
Notice of Allowance from U.S. Appl. No. 14/528,918, dated Dec. 21, 2016, 26 pages.
Notice of Allowance from U.S. Appl. No. 15/421,269, dated Nov. 13, 2017, 9 pages.
Notice of Allowance from U.S. Appl. No. 15/421,269, dated Sep. 8, 2017, 12 pages.
Wireshark User's Guide for Wireshark 1.9 (Oct. 18, 2012) http://wayback.archive.org/web/20121018193345/http://www.wireshark.org/download/docs/user-guide-us.pdf; dated Oct. 18, 2012; last accessed Nov. 29, 2016).
Zabbix Network Monitoring Essentials Tutorial Video (https://www.youtube.com/watch?v=NLt_qR6yKWM&list=PLYoq8isOGa_N7mT7t4k2191CFdg2064wj&index=17; pub date:Oct. 22, 2013).
Advisory Action from U.S. Appl. No. 14/253,753 dated Apr. 29, 2016, 2 pages.
Advisory Action from U.S. Appl. No. 14/253,753 dated May 7, 2015, 2 pages.
Advisory Action from U.S. Appl. No. 14/253,767 dated Mar. 1, 2016, 3 pages.
Advisory Action from U.S. Appl. No. 14/528,932, dated Jul. 14, 2017, 8 pages.
Advisory Action from U.S. Appl. No. 14/609,292, dated Dec. 8, 2017, 5 pages.
Final Office Action from U.S. Appl. No. 14/253,713 dated Feb. 10, 2015, 15 pages.
Final Office Action from U.S. Appl. No. 14/253,713 dated Feb. 12, 2016, 17 pages.
Final Office action from U.S. Appl. No. 14/253,713, dated Dec. 22, 2017, 46 pages.
Final Office Action from U.S. Appl. No. 14/253,744, dated Feb. 21, 2017, 41 pages.
Final Office Action from U.S. Appl. No. 14/253,744 dated Jan. 9, 2015, 29 pages.
Final Office Action from U.S. Appl. No. 14/253,744 dated Oct. 23, 2015, 51 pages.
Final Office Action from U.S. Appl. No. 14/253,753 dated Feb. 4, 2016, 17 pages.
Final Office Action from U.S. Appl. No. 14/253,753 dated Mar. 2, 2015, 19 pages.
Final Office Action from U.S. Appl. No. 14/253,767 dated Apr. 18, 2017, 34 pages.
Final Office Action from U.S. Appl. No. 14/253,767 dated Dec. 16, 2015, 21 pages.
Final Office Action from U.S. Appl. No. 14/253,767 dated Jan. 7, 2015, 14 pages.
Final Office Action from U.S. Appl. No. 14/528,898 dated Jun. 29, 2016, 18 pages.
Final Office Action from U.S. Appl. No. 14/528,932, dated May 5, 2017, 38 pages.
Final Office Action from U.S. Appl. No. 14/609,292, dated Aug. 25, 2017, 39 pages.
Final Office Action from U.S. Appl. No. 14/610,457, dated Jan. 22, 2018, 51 pages.
Fiodin, et al., "Processing Object-Oriented Queries with Invertible Late Bound Functions," Proceedings of the 21st VLDB Conference, 1995, pp. 335-344.
Non-Final Office Action from U.S. Appl. No. 14/253,713 dated Aug. 12, 2015, 17 pages.
Non-Final Office Action from U.S. Appl. No. 14/253,713 dated Jan. 19, 2017, 31 pages.
Non-Final Office Action from U.S. Appl. No. 14/253,713 dated Sep. 3, 2014, 26 pages.
Non-Final Office Action from U.S. Appl. No. 14/253,744 dated Jul. 5, 2016, 31 pages.
Non-Final Office Action from U.S. Appl. No. 14/253,744 dated Jun. 10, 2015, 50 pages.
Non-Final Office Action from U.S. Appl. No. 14/253,744, dated Jun. 16, 2017, 31 pages.
Non-Final Office Action from U.S. Appl. No. 14/253,744 dated Oct. 6, 2014, 34 pages.
Non-Final Office Action from U.S. Appl. No. 14/253,753 dated Jul. 1, 2016, 21 pages.
Non-Final Office Action from U.S. Appl. No. 14/253,753 dated Jul. 28, 2015, 14 pages.
Non-Final Office Action from U.S. Appl. No. 14/253,753 dated Sep. 5, 2014, 16 pages.
Non-Final Office Action from U.S. Appl. No. 14/253,767 dated Jul. 15, 2015, 17 pages.
Non-Final Office Action from U.S. Appl. No. 14/253,767 dated Jun. 19, 2014, 13 pages.
Non-Final Office Action from U.S. Appl. No. 14/253,767 dated Sep. 19, 2016, 21 pages.
Non-Final Office Action from U.S. Appl. No. 14/528,898 dated Mar. 31, 2016, 17 pages.
Non-Final Office Action from U.S. Appl. No. 14/528,918 dated Feb. 17, 2016, 17 pages.
Non-Final Office Action from U.S. Appl. No. 14/528,932 dated Dec. 14, 2016, 19 pages.
Non-Final Office Action from U.S. Appl. No. 14/609,292, dated Apr. 12, 2017, 43 pages.
Non-Final Office Action from U.S. Appl. No. 14/610,457, dated Aug. 4, 2017, 79 pages.
Non-Final Office Action from U.S. Appl. No. 14/699,787, dated Sep. 21, 2017, 67 pages.
Non-Final Office action from U.S. Appl. No. 14/699,807, dated Dec. 28, 2017, 60 pages.
Non-Final Office Action from U.S. Appl. No. 15/421,269, dated Jul. 10, 2017, 39 pages.
Non-Final Office Action from U.S. Appl. No. 15/582,309, dated Sep. 22, 2017, 46 pages.
Notice of Allowance from U.S. Appl. No. 14/253,744, dated Nov. 15, 2017, 12 pages.
Notice of Allowance from U.S. Appl. No. 14/253,744, dated Nov. 27, 2017, 12 pages.
Notice of Allowance from U.S. Appl. No. 14/253,753, dated Feb. 27, 2017, 19 pages.
Notice of Allowance from U.S. Appl. No. 14/253,753, dated Jun. 12, 2017, 16 pages.
Notice of Allowance from U.S. Appl. No. 14/253,753, dated May 23, 2017, 2 pages.
Notice of Allowance from U.S. Appl. No. 14/253,753 dated Nov. 8, 2016, 7 pages.
Notice of Allowance from U.S. Appl. No. 14/528,898, dated May 8, 2017, 29 pages.

* cited by examiner

APPLICATION-BASED CONFIGURATION OF NETWORK DATA CAPTURE BY REMOTE CAPTURE AGENTS

CROSS-REFERENCE TO RELATED APPLICATION

This application claims benefit under 35 U.S.C. § 120 as a continuation of U.S. application Ser. No. 14/253,744, filed Apr. 15, 2014, the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

At least certain embodiments of the invention relate generally to computer networks, and more particularly to a system configured for capturing and processing network data across a distributed network environment.

BACKGROUND OF THE INVENTION

Over the past decade, the age of virtualization has triggered a sea change in the world of network data capture. Almost every network capture product available today is a physical hardware appliance that customers have to purchase and configure. In addition, most network data capture technologies are built from scratch to serve a specific purpose and address the needs of a particular vertical market. For example, network capture systems may be customized to extract data for security and intrusion-detection purposes, collect network performance data, perform Quality of Service (QoS), redirect data, block network traffic, and/or perform other analysis or management of network traffic. Such targeted and/or fixed implementation and use of network capture technologies may preclude modification of the network capture technologies to address different and changing business needs.

Moreover, customers using conventional hardware-based network capture devices typically connect the devices to other hardware devices in a network. The connections may allow the network capture devices to access the network and monitor network traffic between two or more points in the network. Examples of such devices include a network Test Access Point (TAP) or Switched Port Analyzer (SPAN) port. After the network traffic is captured, cumbersome Extraction, Transform, and Load ("ETL") processes may be performed to filter, transform, and/or aggregate data from the network traffic and enable the extraction of business value from the data.

However, customers are moving away from managing physical servers and data centers and toward public and private cloud computing environments that provide software, hardware, infrastructure, and/or platform resources as hosted services using computing, storage, and/or network devices at remote locations. For these customers, it is either impossible, or at best extremely challenging, to deploy physical network capture devices and infrastructure in the cloud computing environments.

Consequently, network data capture may be facilitated by mechanisms for deploying and configuring network capture technology at distributed and/or remote locations.

BRIEF DESCRIPTION OF THE DRAWINGS

For a better understanding of at least certain embodiments, reference will be made to the following detailed description, which is to be read in conjunction with the accompanying drawings, wherein.

DETAILED DESCRIPTION

Figure 1:
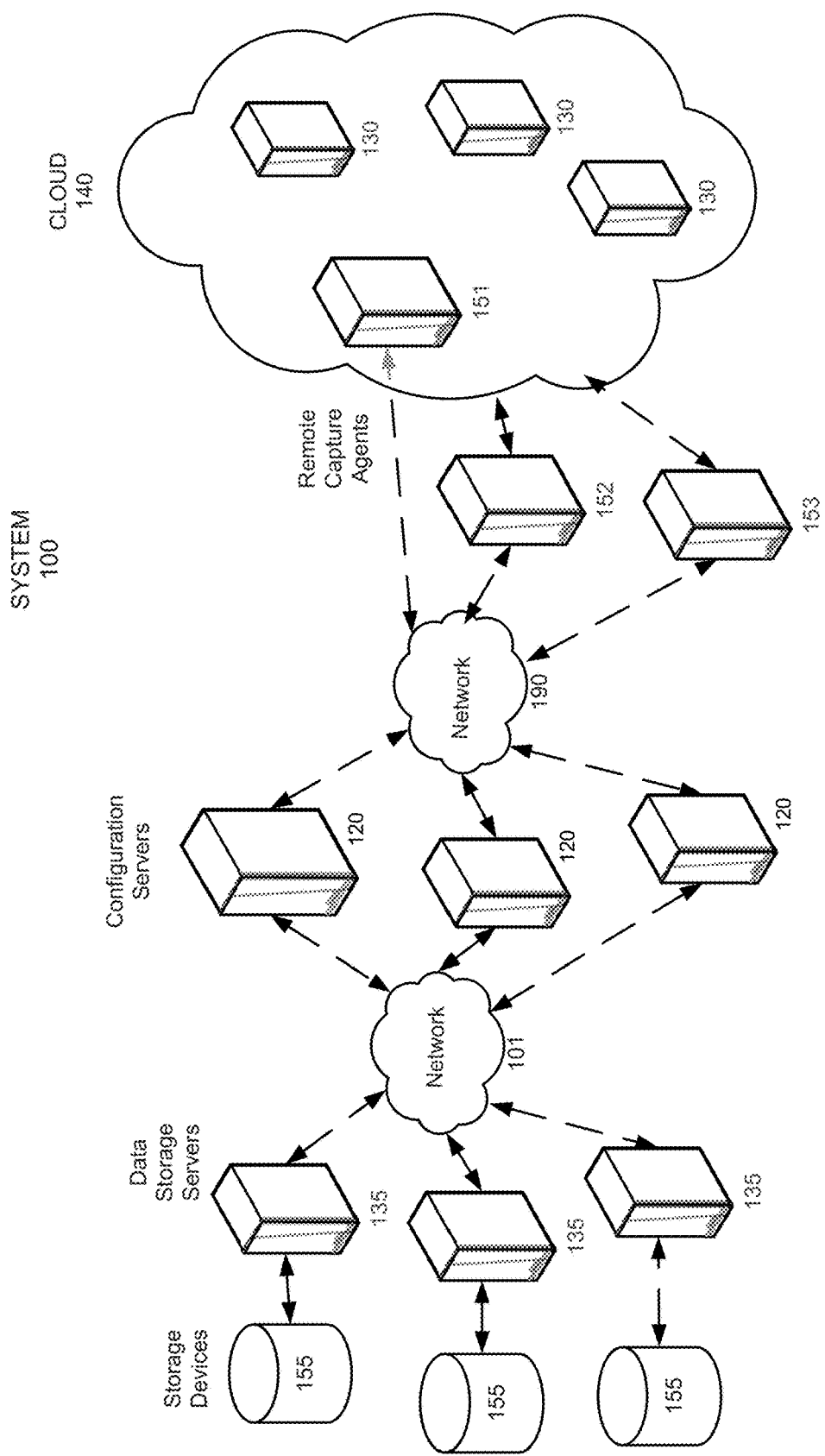
FIG. 1 depicts an example block diagram embodiment of a data processing system for capturing and processing network data in a distributed network environment.

Throughout the description, for the purposes of explanation, numerous specific details are set forth in order to provide a thorough understanding of the present techniques described herein. It will be apparent to one skilled in the art, however, that the present invention may be practiced without some of these specific details. In other instances, well-known structures and devices are shown in block diagram form to avoid obscuring the underlying principles of embodiments of the invention.

1.0. General Overview 1.1. Event-Based Data Storage Systems

Generally, a data-processing system may perform data operations on data stored in one or more data repositories. Depending on the type of data-processing system, the data operations may range from simple operations such as storing and retrieving the data to more complex operations such as calculating statistics from the data, or arranging or formatting the data. One example of a data-processing system is a relational database system, in which data is stored in highly structured tables and accessed through rigid data storage rules (e.g., data storage and retrieval "schemas"). Another example of a data-processing system is a file system, such as a Network File System (NFS) server. Yet another example of a data-processing system is a web application server.

A data-processing system may also include an event-based system, such as the SPLUNK® ENTERPRISE system produced and sold for on-premise and cloud use by Splunk Inc. of San Francisco, Calif. In some event-based systems, data is derived from lines or rows of unstructured time-series data, such as data from web logs and/or machine logs. Each row and/or group of rows is generally associated with a timestamp and one or more associated data points or parameter-value pairs. A timestamp may be any sequence of characters or encoded information that identifies the time at which a certain event is recorded. For example, a timestamp may provide the date, hour, minute, and/or second at which an application is initialized on a computer system. Based on the timestamps, data structures representing events may be derived from the associated data and include some or all of the associated data. A variety of event types may be derived from such data. For example, in the context of web logs, events may be derived from errors, specific user inputs, navigation events, and so forth.

As used herein, the term "events" may refer to anything that occurs and carries information in an event-based system. Some event-based systems feature flexible data storage and retrieval schemas that may be redefined as needed and applied after the associated data is stored in a database or other memory structure of the data storage system. For example, the schemas may be applied upon receiving a request to perform an operation on such data. Such schemas may indicate how to extract one or more pieces of data from data associated with an event. In addition, in connection-oriented network communications systems, a "data stream" generally refers to a sequence of encoded signals (e.g., in network packets) used to transmit or receive information over a network.

1.2. Remote Capture Agent Architecture

One or more embodiments include a network architecture for capturing network data in one or more networks using a configuration server working in combination with a set of remote capture agents distributed throughout the network(s). The remote capture agents may capture network packets from multiple sources (e.g., hosts, servers, etc.) and analyze the network packets to determine the packets' contents. The remote capture agents may then generate one or more events from the network packets and communicate the events to the configuration server over one or more additional networks.

In one or more embodiments, the configuration server includes configuration information used to determine how remote capture agents capture network data and build events therefrom. The remote capture agents may obtain the configuration information from the configuration server (e.g., using a push or pull mechanism) and use the configuration information to generate event data containing a series of timestamped events from the network data. The event data may be included in an event stream that is transmitted to additional network elements within the distributed network for additional processing and/or storage.

In this manner, both network traffic between the remote capture agents and other network elements and subsequent processing of the network traffic by the other network elements may be drastically reduced because capturing and pre-processing of the network data may be performed at the remote capture agents. For example, the remote capture agents may transmit events in lieu of network packets from which the events were generated to one or more centralized servers for further processing, indexing, and/or storage.

1.3. Dynamically Configurable Remote Capture Agents

Remote capture agents may be dynamically configured based on configuration information stored at the configuration server. For example, the remote capture agents may be configured in real-time as events are processed by the remote capture agents. The remote capture agents may be dynamically configured during runtime with: (1) events (or types of events) to be included in event streams for use by other components of the remote capture agent architecture, (2) fields to be included in each of the events streams, and (3) additional parameters associated with generation of the events and/or event streams.

The configuration information may be modified on-demand by users (e.g., administrators) at the configuration server and/or at a network component in communication with the configuration server. The configuration information may also be dynamically updated during processing of event streams by one or more applications running on separate servers in communication with the configuration server, such as one or more data storage servers in communication with the configuration server. Events may then be generated from the captured network packets based on the configuration information and/or any updates to the configuration information.

When changes are made to the configuration information at the configuration server, logic in the remote capture agents may be automatically updated in response. In one embodiment, the remote capture agents poll the configuration server at periodic intervals to determine if there have been any changes to the configuration information stored therein. If changes to the configuration information have been made, the remote capture agents may pull this configuration information from the configuration server. Alternatively, changes to the configuration information may be pushed from the configuration server to the remote capture agents at periodic intervals. Such propagation of updates to the configuration information to the remote capture agents may allow the remote capture agents to be dynamically configured to store different types of network data in events, generate different types of events, aggregate event data, and/or send event data to other network components at different times and/or intervals.

1.4. Transforming Event Data at the Remote Capture Agents

The configuration information may also be used by the remote capture agents to perform higher-level processing of the events before communicating the events to the configuration server. More specifically, the remote capture agents may use some or all of the configuration information to transform (e.g., aggregate, process, clean, filter, etc.) events into one or more sets of transformed event data. The remote capture agents may provide the transformed event data to the configuration server and/or other network components, in lieu of or in addition to the events. The network components may further process the transformed event data and/or store the transformed event data (e.g., in a data storage server).

In one or more embodiments, some or all of the configuration information related to transforming events is specified by applications running on other servers or systems and communicated to the configuration server. For example, the applications may run on a data-processing system such as the SPLUNK® ENTERPRISE system. Users may use the applications to perform queries and/or visualizations related to event data from the remote capture agents. The applications may provide the configuration server with information regarding the events (or types of events) the application is adapted to receive, along with information related to subsequent processing and/or transformation of those events. The configuration server may obtain the information from the applications for propagation to the remote capture agents, and the remote capture agents may use the information to configure or reconfigure the creation and processing of event data accordingly. In one embodiment, the applications include data storage applications running on a data storage server to facilitate optimizing data storage and retrieval operations.

1.5. Graphical Interface for Configuring Event Streams

A graphical user interface (GUI) may facilitate the configuration of the remote capture agents and/or other network components in generating and/or processing event streams containing event data. The GUI may provide a visual way to create, manage, and/or process event streams based on configuration information associated with each event stream. The GUI may be provided by the configuration server and/or by a network element in communication with the configuration server. The GUI may display representations of one or more components associated with creating and/or processing event streams generated from network traffic. The components may be configured or reconfigured using various icons and/or other user-interface elements in the GUI.

2.0. Structural Overview 2.1. Operating Environment

The data processing techniques described herein are suitable for use by systems deployed in a variety of operating environments. FIG. 1 depicts an example block diagram embodiment of a data-processing system 100 for capturing and processing network data in a distributed network environment. In the illustrated embodiment, system 100 includes a set of configuration servers 120 in communication with a set of remote capture agents 151-153 over one or more networks 190.

Although system 100 only depicts three configuration servers 120 and three remote capture agents 151-153, any number of configuration servers 120 and/or remote capture agents 151-153 may be configured to operate and/or communicate with one another within the data-processing system. For example, a single physical and/or virtual server may perform the functions of configuration servers 120. Alternatively, multiple physical and/or virtual servers or network elements may be logically connected to provide the functionality of configuration servers 120. The configuration server(s) may direct the activity of multiple distributed remote capture agents 151-153 installed on various client computing devices across one or more networks. In turn, remote capture agents 151-153 may be used to capture network data from multiple remote network data sources.

Further, embodiments described herein can be configured to capture network data in a cloud-based environment, such as cloud 140 depicted in the illustrated embodiment, and to generate events such as clickstream events and/or business transactions out of the network data. Remote capture agents 151-153 may capture network data originating from numerous distributed network servers, whether they are physical hardware servers or virtual machines running in cloud 140. In cloud-based implementations, remote capture agents 151-153 will generally only have access to information that is communicated to and received from machines running in the cloud-based environment. This is because, in a cloud environment, there is generally no access to any of the physical network infrastructure, as cloud computing may utilize a "hosted services" delivery model where the physical network infrastructure is typically managed by a third party.

Embodiments further include the capability to separate the data capture technology into a standalone component that can be installed directly on client servers, which may be physical servers or virtual machines residing on a cloud-based network (e.g., cloud 140), and used to capture and generate events for all network traffic that is transmitted in and out of the client servers. This eliminates the need to deploy and connect physical hardware to network TAPS or SPAN ports, thus allowing users to configure and change their data capture configuration on-the-fly rather than in fixed formats.

In the illustrated embodiment, remote capture agents 152-153 are in communication with network servers 130 residing in cloud 140, and remote capture agent 151 is located in cloud 140. Cloud 140 may represent any number of public and private clouds, and is not limited to any particular cloud configuration. Network servers 130 residing in cloud 140 may be physical servers and/or virtual machines in cloud 140, and network traffic to and from network servers 130 may be monitored by remote capture agent 151 and/or other remote capture agents connected to network servers 130. Further, remote capture agents 152-153 may also run in cloud 140 on physical servers and/or virtual machines. Those skilled in the art will appreciate that any number of remote capture agents may be included inside or outside of cloud 140.

Remote capture agents 151-153 may analyze network packets received from the networks(s) to which remote capture agents 151-153 are connected to obtain network data from the network packets and generate a number of events from the network data. For example, each remote capture agent 151-153 may listen for network traffic on network interfaces available to the remote capture agent. Network packets transmitted to and/or from the network interfaces may be intercepted by the remote capture agent and analyzed, and relevant network data from the network packets may be used by the remote capture agent to create events related to the network data. Such events may be generated by aggregating network data from multiple network packets, or each event may be generated using the contents of only one network packet. A sequence of events from a remote capture agent may then be included in one or more event streams that are provided to other components of system 100.

Configuration servers 120, data storage servers 135, and/or other network components may receive event data (e.g., event streams) from remote capture agents 151-153 and further process the event data before the event data is stored by data storage servers 135. In the illustrated embodiment, configuration servers 120 may transmit event data to data storage servers 135 over a network 101 such as a local area network (LAN), wide area network (WAN), personal area network (PAN), virtual private network, intranet, mobile phone network (e.g., a cellular network), WiFi network, Ethernet network, and/or other type of network that enables communication among computing devices. The event data may be received over a network (e.g., network 101, network 190) at one or more event indexers (see FIG. 10) associated with data storage servers 135.

In addition, system 100 may include functionality to determine the types of network data collected and/or processed by each remote capture agent 151-153 to avoid data duplication at the indexers, data storage servers 135, and/or other components of system 100. For example, remote capture agents 152-153 may process network traffic from the same network. However, remote capture agent 152 may generate page view events from the network traffic, and remote capture agent 153 may generate request events (e.g., of HyperText Transfer Protocol (HTTP) requests and responses) from the network traffic.

In one or more embodiments, configuration servers 120 include configuration information that is used to configure the creation of events from network data on remote capture agents 151-153. In addition, such configuration may occur dynamically during event processing (e.g., at runtime). Conversely, because most conventional network capture technologies target specific end uses, they have been designed to operate in a fixed way and generally cannot be dynamically or easily modified to address different and changing business needs.

At least certain embodiments described herein are adapted to provide a distributed remote capture platform in which the times at which events are communicated to the configuration servers 120 and the fields to be included in the events are controlled by way of user-modifiable configuration rather than by "hard coding" fixed events with pre-determined fields for a given network capture mechanism. The remote configuration capability described herein also enables additional in-memory processing (e.g., filtering, transformation, normalization, aggregation, etc.) on events at the point of capture (e.g., remote capture agents 151-153) before the events are transmitted to other components of system 100.

Configuration information stored at each configuration server 120 may be created and/or updated manually at the configuration server and/or at a network element in communication with the configuration server. For example, a user may upload a configuration file containing configuration information for a remote capture agent to one or more configuration servers 120 for subsequent propagation to the remote capture agent. Alternatively, the user may use a GUI to provide the configuration information, as described in further detail below with respect to FIGS. 8-9. The configuration information may further be provided by one or more applications running on a separate server or network element, such as data storage servers 135.

Remote capture agents 151-153 may then use the configuration information to generate events from captured network packets. When changes in the configuration information at the configuration server are detected at the remote capture agents, logic in the remote capture agents may be automatically reconfigured in response. This means the remote capture agents may be configured dynamically to produce different events, transform the events, and/or communicate event streams to different components of system 100.

To detect changes in configuration information at configuration servers 120, remote capture agents 151-153 may poll configuration servers 120 at periodic intervals for updates to the configuration information. The updates may then be pulled from configuration servers 120 by remote capture agents 151-153. Conversely, updates to the configuration information may be pushed from configuration servers 120 to remote capture agents 151-153 at periodic intervals and/or when changes to the configuration information have been made.

In one embodiment, configuration servers 120 include a list of event streams generated by remote capture agents 151-153, as well as the configuration information used to generate the event streams at remote capture agents 151-153. The configuration information may include a unique identifier for each event stream, the types of events to be included in the event stream, one or more fields to be included in each event, and/or one or more filtering rules for filtering events to be included in the event stream. Configuration information for dynamically modifying network data capture by remote capture agents (e.g., remote capture agents 151-153) is described in further detail below with respect to FIG. 2.

The configuration information may also specify transformations of network data and/or events into transformed events. Such transformations may include, for example, aggregations of network data and/or events, generation of statistics and/or metrics from the network data or events, and/or cleaning and/or filtering of the network data and/or events. As with other event streams, event streams containing transformed event data may be transmitted from remote capture agents 151-153 to configuration servers 120, data storage servers 135, and/or other components of system 100 for further processing, storage, and/or use.

Configuration information associated with transformed events may be obtained from end users and/or applications running on various network elements that receive the events. For example, an application executing on a data storage server (e.g., data storage servers 135) may provide statistics associated with network usage in cloud 140. To reduce overhead associated with real-time processing of event data by the application into the statistics, the application may provide configuration information for generating some or all of the statistics at one or more remote capture agents (e.g., remote capture agents 151-153) connected to cloud 140. The configuration information may be transmitted to configuration servers 120 and subsequently propagated to the relevant remote capture agents. In turn, the remote capture agents may use the configuration information to generate transformed events containing statistics associated with events captured by the remote capture agents, and the transformed events may be provided to the application to enable access to the statistics by users of the application without requiring the application to calculate the statistics at query time.

Such use of distributed remote capture agents 151-153 may offload processing tasks from configuration servers 120 and/or other components of system 100 to remote capture agents 120 (e.g., similar to parallelizing a network), while avoiding overloading of client network servers at remote networks by burdening the client network servers with the full functionality of configuration servers 120. System 100 may further reduce network traffic between remote capture agents 151-153 and the other components of system 100 because remote capture agents 120 convert a potentially large volume of raw network traffic into a smaller volume of events and further filter the event data as directed by the configuration information before transmitting the event data to other components of system 100.

Another advantage is that the work performed by system 100 may be distributed among multiple remote capture agents 151-153 on one or more networks. Remote capture agents 151-153 may occupy small footprints on remote client servers, thus mitigating resource usage by remote capture agents 151-153 on the client servers. For example, remote capture agents 151-153 may execute as background processes on physical and/or virtualized servers. On the other hand, configuration servers 120 may execute from one or more centralized locations and/or on one or more sets of dedicated resources because the operation of configuration servers 120 may require significantly more computing resources than the operation of remote capture agents 151-153.

As depicted in FIG. 1, system 100 further includes one or more data storage servers 135. Data storage servers 135 may be general or special-purpose computers configured to process and manipulate data within one or more data repositories. As depicted, data storage servers 135 may be coupled to data storage devices 155 using any suitable mechanism, such as a Fiber Channel network, a Serial ATA (SATA) link, a Universal Serial Bus (USB) connection, an Infiniband link, an Ethernet connection, and/or other type of interface. Data storage servers 135 can be configured to communicate input/output (I/O) requests to storage devices 155. These I/O requests may be communicated via messages in protocols such as Server Message Block protocol, Network File System (NFS) protocol, Small Computer System Interface (SCSI) protocol, and/or Fibre Channel. In response to the requests, data storage servers 135 may read and write data structures such as data blocks, files, tables, and/or result sets from storage devices 155. In an embodiment, data storage servers 135 may include some or all of storage devices 155.

Instructions for processing and manipulating data (e.g., event data) may be executed by data storage servers 135. For example, data storage servers 135 may perform data operations with respect to one or more data repositories. Data operations supported by these processes may include relatively simple operations such as adding or retrieving lines or rows of data from the data storage devices. The supported data operations may further include operations such as filtering the contents of retrieved data and./or performing transformations (e.g., aggregations, calculations, processing, cleaning, filtering, etc.) of the retrieved data.

In one or more embodiments, data storage servers 135 and/or configuration servers 120 provide one or more transformation servers that perform additional processing of event data from remote capture agents 151-153. Conversely, one or more configuration servers 120 and/or data storage servers 135 may be installed within a transformation server and/or execute independently from transformation servers in the data-processing system 100. The transformation servers may be used to aggregate, filter, format, query, transform, store, and/or otherwise manipulate event data, as described in further detail below with respect to FIG. 8.

In another embodiment, data storage servers 135 may constitute one or more conventional database servers, such as a relational database server. These processes need not necessarily support the entire functionality of a database server or operate on conventional database structures.

Data repositories accessed by data storage servers 135 may be stored on data storage devices 155. Data storage devices 155 may be, for instance, nonvolatile computer-readable media such as hard disk drives, flash/SSD drives, nonvolatile memory, optical storage devices, disk arrays, storage area network devices, networked-attached storage devices, and/or file server devices. Storage devices 155 may store the data repositories in any suitable underlying form(s), such as disk blocks, file structures, or database tables. If multiple storage devices 155 are used in system 100, different portions of a data repository may be stored on different storage devices 155. Optionally, certain storage devices 155 may be configured to store some or all portions of a data repository redundantly, using any suitable backup or synchronization mechanism(s).

In an embodiment, each storage device 155 is equally accessible to each data storage server 135, and thus any data storage server 135 may perform operations on any data stored within the data repositories. In other embodiments, each data storage server 135 is assigned to only some or even one of the data storage devices 155, and is only configured to perform operations on data storage device(s) 155 to which it is assigned.

System 100 is only one example of the many types of operating environments in which the techniques described herein may be practiced. Other suitable operating environments may include additional or fewer elements, in varying arrangements. For instance, some or all data storage servers 135 may be replaced by virtual computing environments (e.g., virtual machines), some or all of which may execute on a single computing device.

System 100 further utilizes data repositories provided by storage devices 155. The data repositories may include one or more data collections, and each data collection may be a collection of data structures having a variety of forms. For example, a data collection may include a collection of time-based event data structures (e.g., one or more event streams), a group of data rows, a relational database, a relational database table, set of Extended Markup Language (XML) elements, and/or one or more files. Different data collections within the same repository may support different data structure types. In an embodiment, a data collection containing of any of the foregoing data structures is augmented with system-defined or user-defined variables that can be updated to describe certain characteristics of the data stored in the data collection. Examples of such variables may include counters or metrics. In an embodiment, each data collection is stored redundantly on multiple data storage devices 155, and synchronized therebetween. In an embodiment, each data collection is found on only some or even one of the data storage devices 155.

Figure 2:
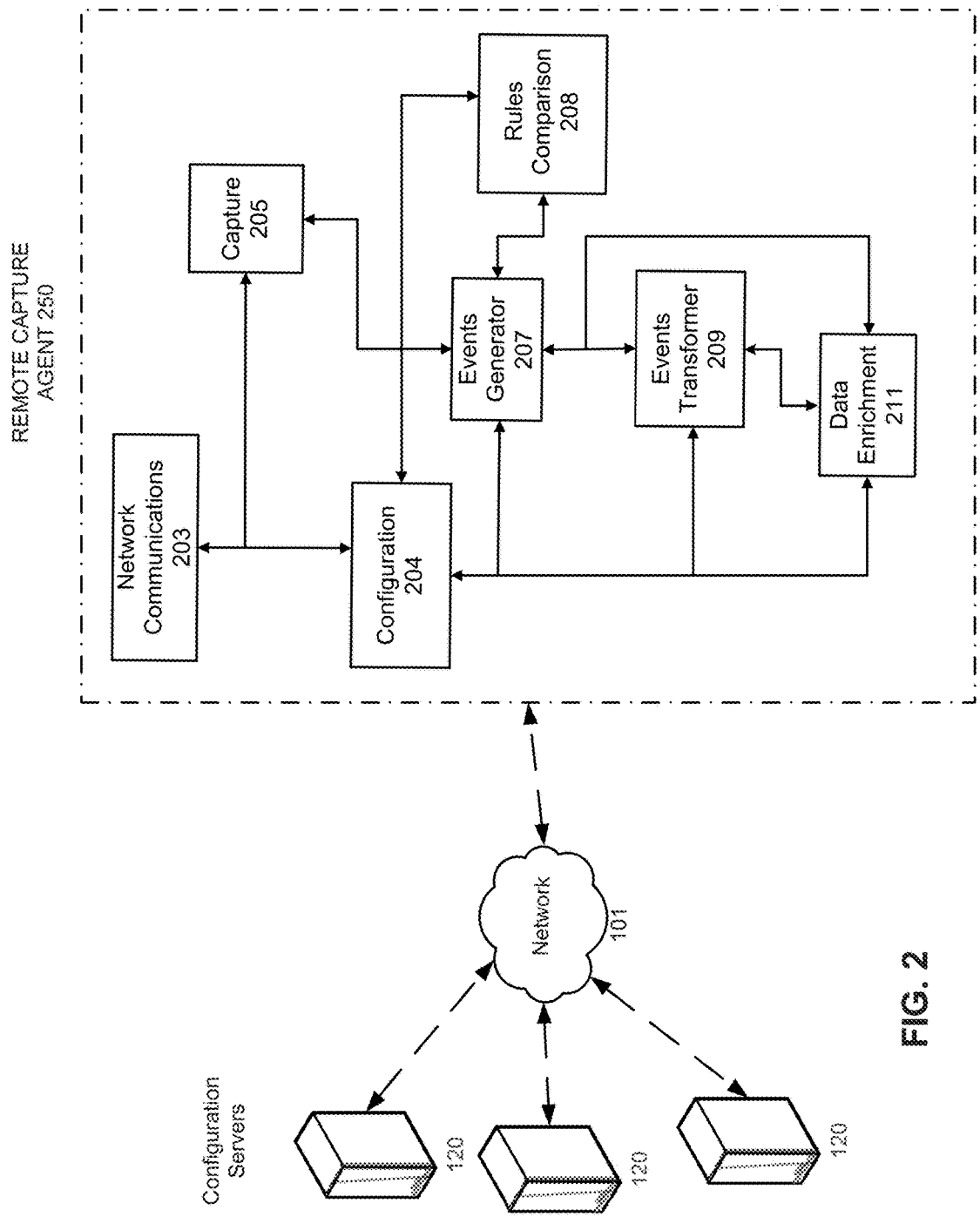
FIG. 2 depicts an example block diagram embodiment of a remote capture agent.

FIG. 2 depicts an example block diagram embodiment of a remote capture agent 250. In the illustrated embodiment, remote capture agent 250 is adapted to receive configuration information from one or more configuration servers 120 over network 101. Remote capture agent 250 may be installed at a customer's premises on one or more of the customer's computing resources. For example, remote capture agent 250 may be installed on a physical server and/or in a virtual computing environment (e.g., virtual machine) that is distributed across one or more physical machines.

Remote capture agent 250 includes a network communications component 203 configured to communicate with network elements on one or more networks (e.g., network 101) and send and receive network data (e.g., network packets) over the network(s). As depicted, network communications component 203 may communicate with configuration servers 120 over network 101. Network communications component 203 may also communicate with one or more sources of network data, such as network servers 130 of FIG. 1.

Network data received at network communications component 203 may be captured by a capture component 205 coupled with network communications component 203. Capture component 205 may capture some or all network data from network communications component 203. For example, capture component 205 may capture network data based on the sources and/or destinations of the network data, the types of network data, the protocol associated with the network data, and/or other characteristics of the network data.

In addition, the network data may be captured based on configuration information stored in a configuration component 204 of remote capture agent 250. As mentioned above, the configuration information may be received from configuration servers 120 over network 101. The configuration information may then be used to dynamically configure or reconfigure remote capture agent 250 in real-time. For example, newly received configuration information in configuration component 204 may be used to configure the operation of remote capture agent 250 during processing of events from network data by remote capture agent 250.

To dynamically configure remote capture agent 250, configuration information received by configuration component 204 from configuration servers 120 may be provided to other components of remote capture agent 250. More specifically, remote capture agent 250 includes an events generator 207 that receives network data from network data capture component 205 and generates events from the network data based on configuration information from configuration component 204.

Using configuration information provided by configuration servers 120, remote capture agent 250 can be instructed to perform any number of event-based processing operations. For example, the configuration information may specify the generation of event streams associated with network (e.g., HTTP, Simple Mail Transfer Protocol (SMTP), Domain Name System (DNS)) transactions, business transactions, errors, alerts, clickstream events, and/or other types of events. The configuration information may also describe custom fields to be included in the events, such as values associated with specific clickstream terms. The configuration information may include additional parameters related to the generation of event data, such as an interval between consecutive events and/or the inclusion of transactions and/or errors matching a given event in event data for the event.

An events transformer 209 may further use the configuration information to transform some or all of the network data from capture component 205 and/or events from events generator 207 into one or more sets of transformed events. In one or more embodiments, transformations performed by events transformer 209 include aggregating, filtering, cleaning, and/or otherwise processing events from events generator 207. Configuration information for the transformations may thus include a number of parameters that specify the types of transformations to be performed, the types of data on which the transformations are to be performed, and/or the formatting of the transformed data.

For example, configuration information for generating an event stream from network data (e.g., at events generator 207) may include the following Javascript Object Notation (JSON) data:

```
{
    "id" : "trans_class",
    "name": "auto-classified transactions",
    "streamType" : "trans_class"
}
```

The JSON data may include a unique identifier (e.g., "id") of "trans_class" for the event stream, a descriptive name (e.g., "name") of "auto-classified transactions" for the event stream, and an event stream type (e.g., "streamType") of "trans_class." Event data in the event stream may be identified by the identifier and/or descriptive name. The "trans_class" event stream type may indicate that events in the event stream represent automatically classified transactions such as user logins and logouts, shopping cart checkouts, new user signups, and/or file transfers, with a new event generated per automatically classified transaction. In addition, the event may include a unique identifier for the classified transaction type, as well as a Uniform Resource Identifier (URI) stem, a query string, a host name, and/or a page title for the transaction.

In another example, configuration information for performing transformations on events from events generator 207 (e.g., at events transformer 209) may include the following JSON data:

```
{
    "id" : "trans_metrics",
    "name": "transaction metrics aggregated by id",
    "streamType" : "agg_trans",
    "fields" : [
        {
            "name" : "sessions",
            "desc" : "total number of visitor sessions",
            "term" : "clickstream.new-session",
            "aggType" : "sum"
        },
        {
            "name" : "hits",
            "desc" : "total number of HTTP transactions",
            "term" : "clickstream.page-hits",
            "aggType" : "sum"
        },
        {
            "name" : "cs_bytes",
            "desc" : "total octets from client to server (ingress)",
            "term" : "clickstream.cs-bytes",
            "aggType" : "sum"
        },
        {
            "name" : "sc_bytes",
            "desc" : "total octets from server to client (egress)",
            "term" : "clickstream.sc-bytes",
            "aggType" : "sum"
        },
        {
            "name" : "total_time",
            "desc" : "total clock time from start to end of the transaction (microsec)",
            "term" : "clickstream.page-load",
            "aggType" : "sum"
        },
        {
            "name" : "redirect_time",
            "desc" : "total clock time spent processing HTTP redirects (microsec)",
            "term" : "clickstream.page-load-redirect",
            "aggType" : "sum"
        },
        {
            "name" : "base_time",
            "desc" : "total clock time spent loading the base HTML file (microsec)",
            "term" : "clickstream.page-load-base",
            "aggType" : "sum"
        },
        {
            "name" : "content_time",
            "desc" : "total clock time spent loading everything else (microsec)",
            "term" : "clickstream.page-load-content",
            "aggType" : "sum"
        },
        {
            "name" : "time_taken",
            "desc" : "sum of measurements from start to end of each HTTP transaction (microsec)",
            "term" : "clickstream.time-taken",
            "aggType" : "sum"
        },
        {
            "name" : "client_rtt_sum",
            "desc" : "sum of round trip time measurements between client & agent (microsec)",
            "term" : "clickstream.cp-rtt-sum",
            "aggType" : "sum"
        },
        {
            "name" : "client_rtt_count",
            "desc" : "count of round trip time measurements between client & agent",
            "term" : "clickstream.cp-rtt-packets",
            "aggType" : "sum"
        },
        {
            "name" : "server_rtt_sum",
            "desc" : "sum of round trip time measurements between server & agent (microsec)",
```

-continued

```
        "term" : "clickstream.ps-rtt-sum",
        "aggType" : "sum"
    },
    {
        "name" : "server_rtt_count",
        "desc" : "count of round trip time measurements between server
& agent",
        "term" : "clickstream.ps-rtt-packets",
        "aggType" : "sum"
    },
    {
        "name" : "refused",
        "desc" : "total number of HTTP transactions that were refused
by
the server",
        "term" : "clickstream.refused",
        "aggType" : "sum"
    },
    {
        "name" : "canceled",
        "desc" : "total number of HTTP transactions that were canceled
by the client",
        "term" : "clickstream.canceled",
        "aggType" : "sum"
    },
    {
        "name" : "cached",
        "desc" : "total number of HTTP transactions that had cached
responses",
        "term" : "clickstream.cached",
        "aggType" : "sum"
    }
    ]
}
```

The JSON data may include a unique identifier (e.g., "id") of "trans_metrics" for the set of transformed events and a descriptive name (e.g., "name") of "transaction metrics aggregated by id" for the transformed events. The JSON data may also provide an event stream type (e.g., "streamType") of "agg_trans," indicating that the configuration relates to transformations that aggregate transactions from other event data, such as event data generated using the "trans_class" configuration above. The JSON data may additionally include a list of custom fields (e.g., "fields") that specify the types of data to be aggregated, such as numbers of visitor sessions or HTTP transactions, octets between clients and servers, clock times associated with page loads, and/or round-trip time (RTT) measurements between various network components. Each field may include a name (e.g., "name") for the corresponding aggregation, a description (e.g., "desc") of the aggregation, a clickstream term (e.g., "term") representing the data to be aggregated, and an aggregation type (e.g., "aggType"). While the exemplary configuration information above shows an aggregation type of "sum" (e.g., summing of values represented by "term" across all events within an aggregation interval) for all aggregations, other aggregation types may be supported by remote capture agent 250. Such aggregation types may include, for example, a key (e.g., hash) for each set of aggregated values, statistics (e.g., mean, median, variance, standard deviation, minimum value, maximum value, etc.) associated with the aggregated values, a uniqueness count for each unique value within an aggregation interval, and/or calculations used to aggregate values from two or more fields.

A rules comparison engine 208 in remote capture agent 250 may receive events from event generator 207 and compare one or more fields from the events to a set of filtering rules in the configuration information to determine whether to include the events in an event stream. For example, the configuration information may specify packet-level, protocol-level, and/or application-level filtering of event data from event streams generated by remote capture agent 250.

Finally, a data enrichment component 211 may further transform event data to a different form or format based on the configuration information from configuration component 204. For example, data enrichment component 211 may use the configuration information to normalize the data so that multiple representations of the same value (e.g., timestamps, measurements, etc.) are converted into the same value in transformed event data.

Data can be transformed by data enrichment component 211 in any number of ways. For example, remote capture agent 250 may reside on a client server in Cupertino, Calif., where all the laptops associated with the client server have been registered with the hostname of the client server. Remote capture agent 250 may use the registration data to look up an Internet Protocol (IP) address in a look-up table (LUT) that is associated with one or more network elements of the client server's local network. Remote capture agent 250 may then resolve a user's IP address into the name of the user's laptop, thereby enabling inclusion of the user's laptop name in transformed event data associated with the IP address. The transformed event data may then be communicated to configuration servers 120 and/or a central transformation server residing in San Francisco for further processing, indexing, and/or storage.

Figure 3:
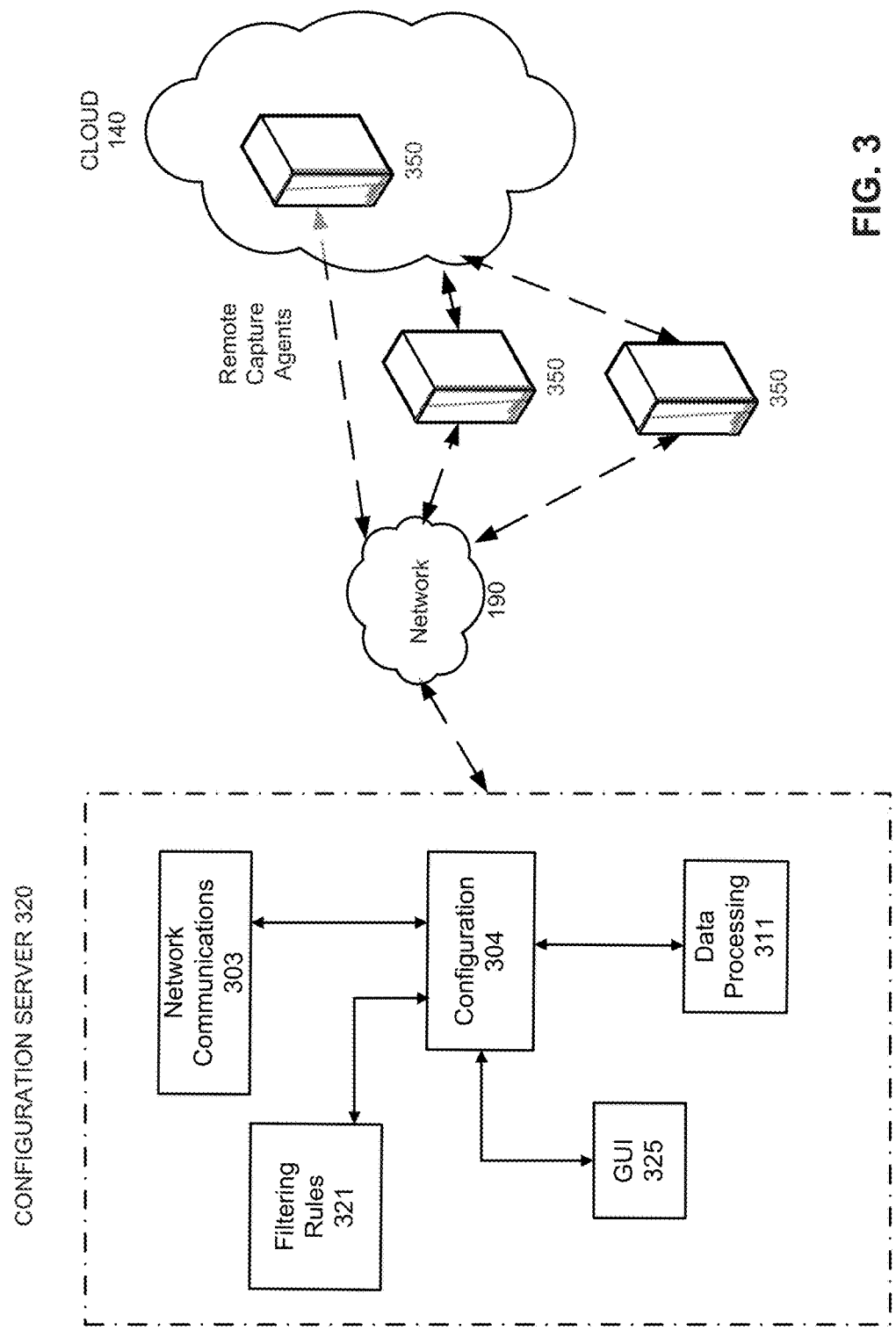
FIG. 3 depicts an example block diagram embodiment of a configuration server.

A further advantage of the techniques described herein includes relates to the transformation of network data at least at two distinct levels, including at the remote capture agents during generation of the events and at the configuration server and/or other components during subsequent processing of event data. FIG. 3 depicts an example block diagram embodiment of a configuration server 320. As shown in the illustrated embodiment, configuration server 320 is in communication with multiple remote capture agents 350 over network 190, and remote capture agents 350 are distributed throughout network 190 and cloud 140. Configuration server 320 includes a network communications component 303 that receives events from remote capture agents 350 over networks 190 and/or 140. Communications component 303 may also communicate with one or more data storage servers, such as data storage servers 135 of FIG. 1.

Configuration server 320 also includes a configuration component 304 that stores configuration information for remote capture agents 350. As described above, the configuration information may specify the types of events to produce, data to be included in the events, and/or transformations to be applied to the data and/or events to produce transformed events. Some or all of the transformations may be specified in a set of filtering rules 321 that may be applied to event data at remote capture agents 350 to determine a subset of the event data to be included in one or more event streams that are sent to configuration server 320 and/or other components.

Configuration server 320 also includes a data processing component 311 that performs additional processing of the event streams based on configuration information from configuration component 304. As discussed in the above example with respect to FIG. 2, event data may be transformed at a remote capture agent (e.g., remote capture agent 250) during resolution of the user's IP address was into the name of the user's laptop. The transformed event data may be sent to configuration server 320 and/or a transformation server for additional processing and/or transformation, such as taking the host name from the transformed event data, using an additional LUT to obtain a user identifier (user ID) of the person to which the laptop is registered, and further transforming the event data by including the user ID in the event data before forwarding the event data to a third server (e.g., a transformation server) for another round of processing.

Configuration server 320 may also provide a GUI 325 that can be used to configure or reconfigure the information contained in configuration component 304. The operation of GUI 325 is discussed in further detail below with respect to FIGS. 7-9.

3.0. Functional Overview 3.1. Remote Capture Agent Architecture

Figure 4:
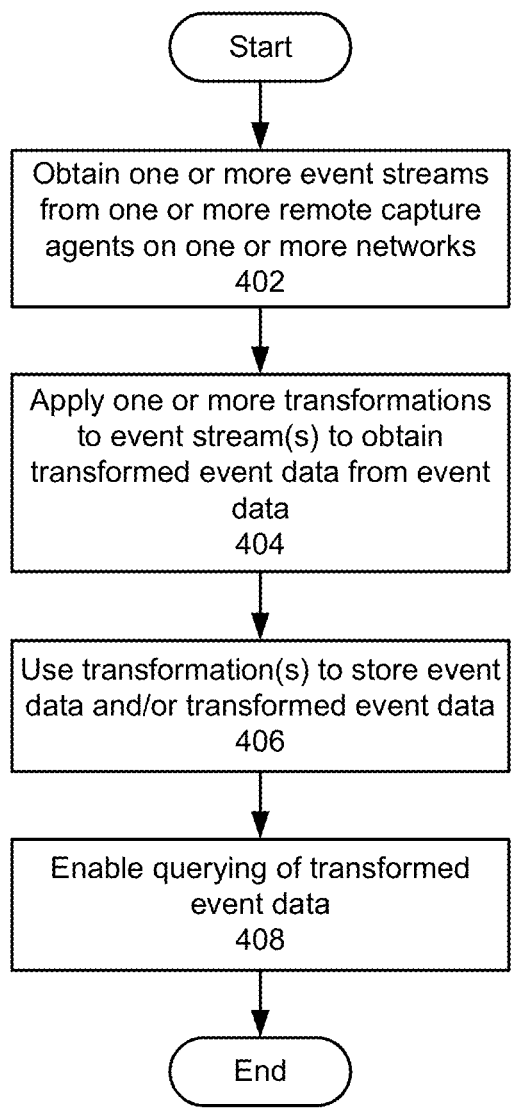
FIG. 4 shows a flowchart illustrating the processing of network data.

The techniques described in this section can be performed by the data processing system for capturing and processing network data in a distributed network environment as shown in FIG. 1. FIG. 4 shows a flowchart illustrating the processing of network data. More specifically, FIG. 4 shows a flowchart of network data capture and processing in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, one or more event streams are obtained from one or more remote capture agents on one or more networks (operation 402). The event streams may include event data that is generated from network data (e.g., network packets) captured by the remote capture agent(s) on the network(s). For example, the event streams may include a series of sequentially timestamped events, with each event generated from data in one or more network packets related to the event. As a result, event data for the event may include information such as an identifier, a transaction type (e.g., for an HTTP transaction and/or business transaction), a timestamp, and/or any errors associated with the event. In addition, the event data may be associated with (e.g., represent) clickstream data, transactions, business transactions, errors, and/or alerts.

The event streams may additionally include transformed event data generated from the network data and/or event data by the remote capture agent(s). For example, the event streams may include transformed event data that is obtained by performing aggregations, calculations, filtering, normalization, and/or formatting of the network data and/or event data at the remote capture agent(s).

Next, one or more transformations are applied to the event stream(s) to obtain transformed event data from the event data (operation 404). As with any transformations already applied at the remote capture agent(s), the transformation(s) may include aggregations, calculations, filtering, normalization, and/or formatting of the network data and/or event data at the remote capture agent(s). Moreover, the transformation(s) may be applied on top of previous transformations performed by the remote capture agent(s), so that one round of transformations may initially be applied at the remote capture agent(s) during generation of the event streams and another round after the event streams are received from the remote capture agent(s). Such transformation(s) may be performed by one or more reactors on one or more transformation servers, as described in further detail below with respect to FIG. 7.

The transformation(s) may also be used to store the event data and/or transformed event data (operation 406). For example, the transformation(s) may be used to store the event data and/or transformed event data in a database and/or log file. Finally, querying of the transformed event data is enabled (operation 408). For example, the transformed event data may be indexed, and queries may be executed on the indexed, transformed event data. The queries may further be performed in parallel on different subsets of the transformed event data. For example, a set of indexers may be used to index mutually exclusive time spans of the transformed event data and query the transformed event data using a map-reduce technique that operates on the time spans in parallel, as described in further detail below with respect to FIGS. 10-12.

Similarly, capturing of the network data may be divided among the remote capture agents to avoid data duplication. In addition, the remote capture agents may execute in and/or capture the network data from one or more virtual machines running in a cloud-based environment. This avoids the necessity of using a network TAP or SPAN port connection for access to and/or capturing of network data from physical network infrastructure.

3.2. Dynamically Configurable Remote Capture Agents for Capturing Network Data

Figure 5:
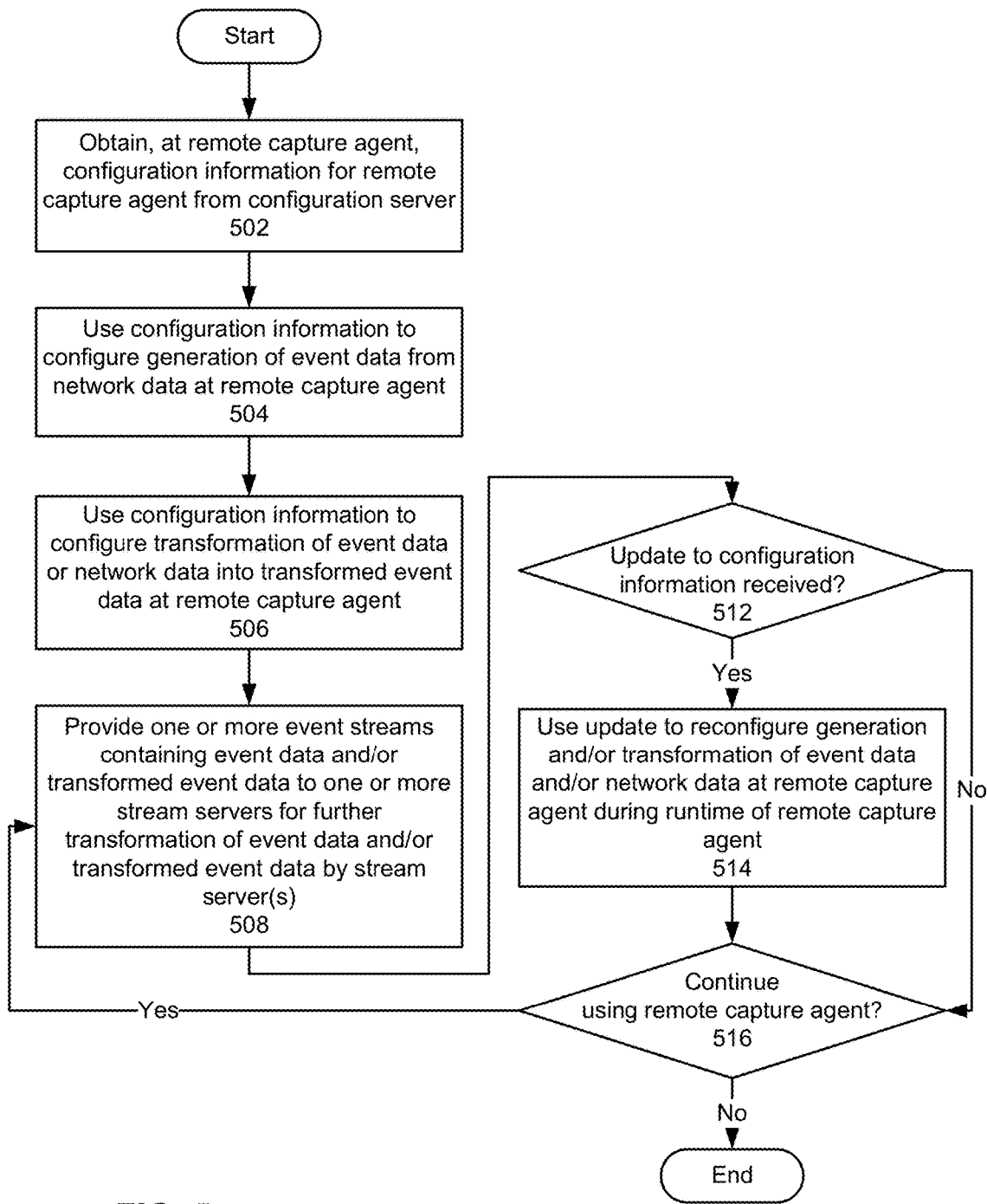
FIG. 5 shows a flowchart illustrating the process of facilitating the processing of network data.

FIG. 5 shows a flowchart illustrating the process of facilitating the processing of network data. More specifically, FIG. 5 shows a flowchart of configuring a remote capture agent in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, configuration information for a remote capture agent is obtained at the remote capture agent from a configuration server (operation 502). The remote capture agent may be located on a separate network from that of the configuration server. For example, the remote capture agent may be installed on a physical and/or virtual machine on a remote network and/or cloud. As discussed above, the remote capture agent and other remote capture agents may be used to capture network data from a set of remote networks in a distributed manner. The captured network data may then be converted into event data that is included in a number of event streams by the remote capture agent(s). For example, a remote capture agent may generate an event to be included in an event stream by identifying one or more network packets associated with a packet and using the network data from the network packet(s) to generate event data corresponding to the event.

The configuration information may include a unique numeric or string identifier for each event stream to be generated by the remote capture agent. The configuration information may also include a description and/or a descriptive name of the event stream. The configuration information may further specify an event stream type that identifies the type of event data (e.g., clickstream events, HTTP transactions, business transactions, errors, alerts, classified transactions, etc.) to be included in the event stream. Finally, the configuration information may include a list of custom fields (e.g., for including specific pieces of network data in the events) and/or one or more additional parameters associated with generating the event data (e.g., time interval between events, maximum number of cached and/or aggregated events, inclusion of matching transactions or errors in the event data, types of events used by the event stream, etc.).

Next, the configuration information is used to configure the generation of event data from network data (e.g., from network packets) at the remote capture agent (operation 504). For example, the configuration information may be used to configure the remote capture agent to identify certain types of network packets, extract network data from the network packets, and/or include the network data in the event data. The configuration information may also be used to configure the transformation of event data or network data into transformed event data at the remote capture agent (operation 506).

For example, the configuration information may specify that the event data and/or network data be aggregated into a sum, statistic (e.g., mean, median, minimum, maximum, etc.), and/or uniqueness count (e.g., number of times a unique value is found in an aggregation interval). To aggregate the event data and/or network data, a time interval associated with aggregation of the event data and/or network data may be obtained, and the event data and/or network data within the time interval may be aggregated into an event count, statistic, and/or uniqueness count. The configuration information may also specify a calculation (e.g., mathematical function, mathematical formula, etc.) to be performed on the network data and/or event data to produce the transformed event data. The configuration information may further provide a filter (e.g., regular expression, range of values, exact value, etc.) for removing a subset of the event data and/or network data to produce the transformed event data. The configuration information may additionally specify a normalization that is used to transform different representations of the same value (e.g., timestamp, host name, resource name, location, etc.) into the same normalized value. Finally, the configuration information may provide a formatting that may be applied to the event data and/or network data to generate transformed event data that adheres to a specific format.

After the remote capture agent is configured, one or more event streams containing the event data and/or transformed event data from the remote capture agent are provided to one or more transformation servers for further transformation of the event data and/or transformed event data by the transformation server(s) (operation 508). For example, the event stream(s) may be transmitted over one or more networks to the transformation server(s), and the transformation server(s) may perform additional aggregations, calculations, filtering, normalization, and/or formatting associated with the event data and/or transformed event data.

An update to the configuration information may be received (operation 512) by the remote capture agent. For example, the update may be detected by the remote capture agent after polling the configuration server and determining that the version of configuration information at the configuration server is newer than the version at the remote capture agent. The remote capture agent may then pull the update from the configuration server. Alternatively, the update may be pushed from the configuration server to the remote capture agent. If no update is received, the remote capture agent may continue to be used (operation 516) to capture network data as-is.

If an update to the configuration information is received, the update is used to reconfigure the generation and/or transformation of event data and/or network data at the remote capture agent during runtime of the remote capture agent (operation 514). For example, the remote capture agent may be reconfigured to generate and/or transform the event data and/or network data while the remote capture agent continues to generate event streams containing event data and/or network data according to the old configuration.

The remote capture agent may continue to be used (operation 516) to capture network data with or without reconfiguring the remote capture agent using updates to the configuration information. If the remote capture agent is to be used, one or more event streams from the remote capture agent are continually provided to one or more transformation servers for further transformation by the transformation server(s) (operation 508), and any updates to the configuration information are used to reconfigure the operation of the remote capture agent (operations 512-514) during generation of the event stream(s). Capture of network data by the remote capture agent may continue until the remote capture agent is no longer used to generate event data and/or transformed event data from network data at the network to which the remote capture agent is connected.

In one or more embodiments, some or all of the configuration information is provided to the configuration server by an application used to access the transformed event data. The application may be designed around one or more specific use cases associated with network data captured by the remote capture agent, such as managing virtual machines, assessing network security, performing web analytics, and/or managing web application performance. The application may also execute on the SPLUNK® ENTERPRISE platform and have access to both the configuration server and event data generated by the remote capture agent.

To offload processing of the event data at the application (e.g., during real-time querying and/or visualization of the event data), the application may provide configuration information for performing the processing at the remote capture agent to the configuration server, and the configuration server may propagate the configuration information to the remote capture agent. In turn, the remote capture agent may use the configuration to perform the processing as the event data is generated and/or transformed instead of requiring the application to perform significant processing the event data in real-time. In other words, subsequent real-time processing of event data by the application and the associated overhead associated with such processing may be reduced by providing configuration information that causes the remote capture agent to transform event data into a form that can be used by the application.

This may integrate better with a late-binding schema, such as the late-binding schema implemented by Splunk Inc. of San Francisco, Calif., because significant resources may be required to aggregate, format, and/or otherwise transform event data and extract fields at run-time. The term "late-binding schema" refers to a system, such as SPLUNK® ENTERPRISE, where the schema need not be defined at index time, as with database technology. Rather, in a system involving late-binding schema, the schema can be developed on an ongoing basis up until a query, during execution, applies (binds) the schema to data to evaluate the data. As a user learns more about the data in stored events, in a late-binding schema, he/she can continue to develop the schema up until the next time it is needed for a query. Because SPLUNK® ENTERPRISE maintains the underlying raw data and enables application of a late-binding schema, SPLUNK® ENTERPRISE may have greater capability to enable deep exploration of the data to solve problems reflected in the data and answer questions about the data than conventional databases or data-processing systems that merely store summaries or portions of data.

For example, a security application monitoring login attempts on a web application may use incorrect password entries by users during the login attempts to assess the security of the web application. The security application may provide configuration information for generating event data corresponding to login failures, with the event data containing usernames, IP addresses, timestamps, and/or passwords entered for the login failures. Because the security application may receive events only when failed login attempts occur, the security application may not be required to filter the event data for failed login attempts.

Continuing with the above example, the configuration information may specify the aggregation of failed login attempts into failed login attempts per minute. Thus, instead of receiving an event every time a failed login attempt occurs, the security application may receive event data every minute that indicates the number of failed login attempts for the last minute.

3.3. Operation of Configuration Server

Figure 6:
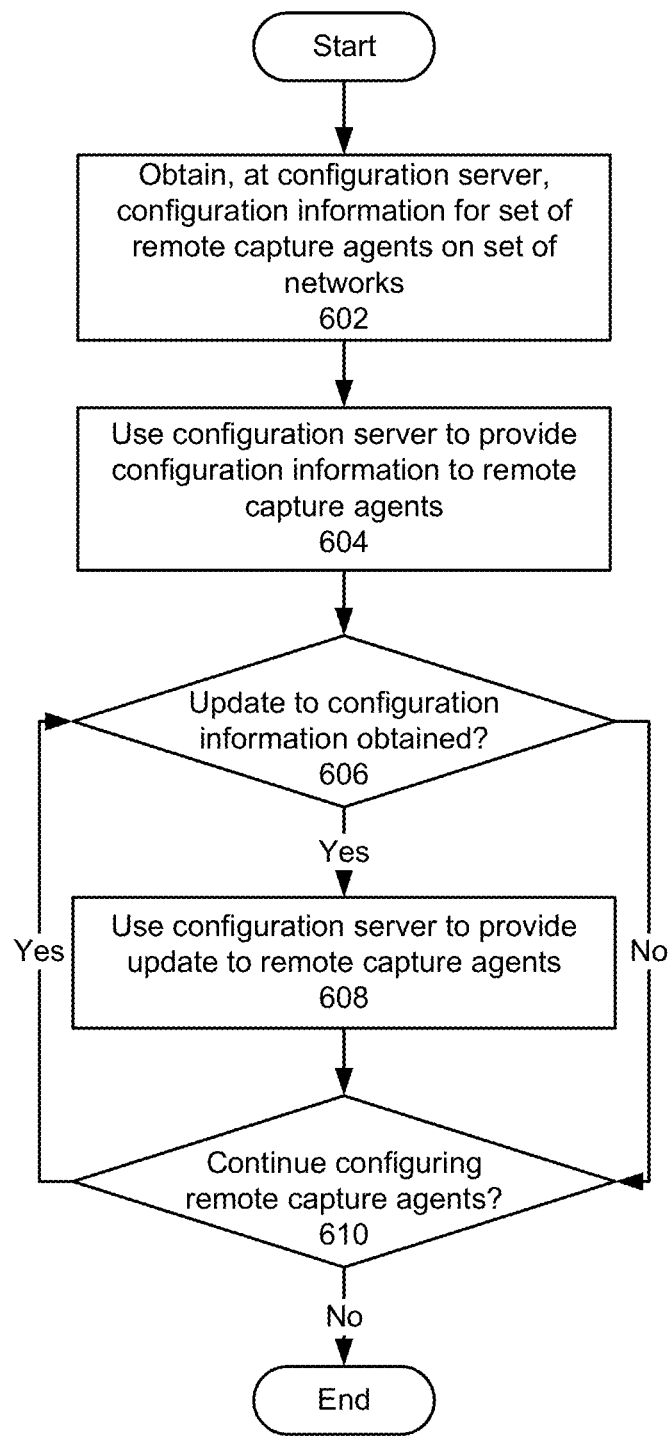
FIG. 6 shows a flowchart illustrating the process of facilitating network data capture.

FIG. 6 shows a flowchart illustrating the process of facilitating data capture. In particular, FIG. 6 shows a flowchart illustrating the process of operating a configuration server in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

First, configuration information for a set of remote capture agents on a set of networks is obtained at the configuration server (operation 602). The configuration information may be obtained from a user e, g, an administrator) and/or an application used to access event data generated by the remote capture agents. Next, the configuration server is used to provide the configuration information to the remote capture agents (operation 604). For example, the configuration server may use a push and/or pull mechanism to transmit the or more event streams to generate visualizations based onhe configuration information may then be used by the remote capture agents to configure the generation and/or transformation of event data, as described above.

An update to the configuration information may be obtained (operation 606). For example, an update to the configuration information may be obtained to enable the generation of new event streams at one or more of the remote capture agents for use with one or more new use cases associated with network data capture by the remote capture agent(s). If an update to the configuration information is obtained, the configuration server is used to provide the update to the remote capture agents (operation 608), and the update is used to reconfigure the generation and/or transformation of the event data at the remote capture agents during runtime of the remote capture agents. If no update is received, no additional configuration information may be transmitted between the configuration server and remote capture agents.

The remote capture agents may continue to be configured (operation 610) using configuration information from the configuration server. If the remote capture agents are to be configured using the configuration server, any updates to the configuration information are transmitted from the configuration server to the remote capture agents (operation 606-608) to enable reconfiguration of the remote capture agents. Such transmission of updates to the configuration information to the remote capture agents may continue until the configuration server is no longer used to dynamically configure the remote capture agents.

3.4. GUI for Configuring Event Streams

Figure 7:
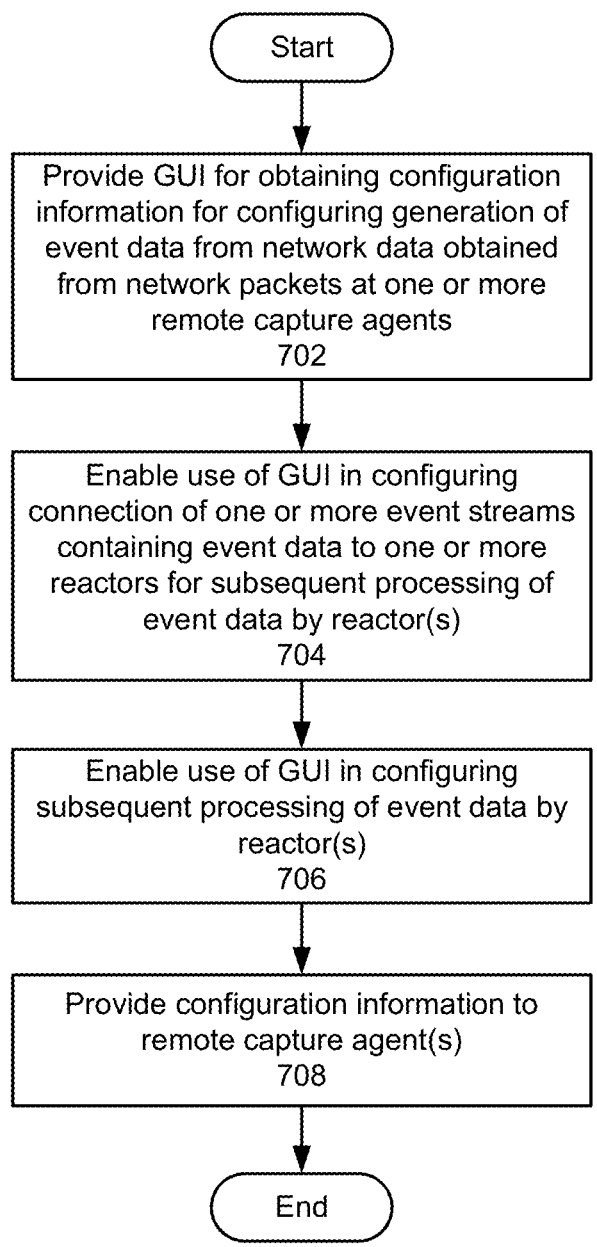
FIG. 7 shows a flowchart illustrating the process of facilitating the processing of network data.

FIG. 7 shows a flowchart illustrating the process of facilitating the processing of data. More specifically, FIG. 7 shows a flowchart of using a GUI to obtain configuration information for managing event streams in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, the GUI is provided for obtainining configuration information for configuring the generation of event data from network data obtained from network packets at one or more remote capture agents (operation 702). The configuration information may be obtained using a configuration dialog of the GUI, as discussed in further detail below with respect to FIG. 9.

Next, use of the GUI in configuring the connection of one or more event streams containing the event data to one or more reactors for subsequent processing of the event data by the reactor(s) is enabled (operation 704). For example, graphical representations of the event stream(s) and reactor(s) may be displayed in the GUI, and directed edges for connecting the graphical representations may be provided by the GUI. A directed edge from one component (e.g., event stream or reactor) to another may thus represent the passing of output from the component as input to the second component. Using GUIs to connect event streams and reactors is described in further detail below with respect to FIG. 8.

Use of the GUI in configuring the subsequent processing of the event data by the reactor(s) is also enabled (operation 706). For example, the GUI may provide a separate configuration dialog for configuring each type of reactor used to process event streams. Finally, the configuration information is provided to the remote capture agent(s), where the configuration information is used to configure the generation of the event data at the remote capture agent(s) during runtime of the remote capture agent(s).

In one or more embodiments, reactors are provided by one or more transformation servers that transform the event data after the event data is created and/or initially transformed at the remote capture agent(s). As noted above, configuration servers may be transformation servers. Alternatively, a configuration server may be included within a transformation server and/or execute independently from the transformation server. The reactors may include collection reactors that collect event and/or network data, processing reactors that process event and/or network data, and/or storage reactors that store event and/or network data. Within the GUI, the reactors may be represented by icons and/or other user-interface elements that may be selected to configure the operation of the reactors.

Figure 8:
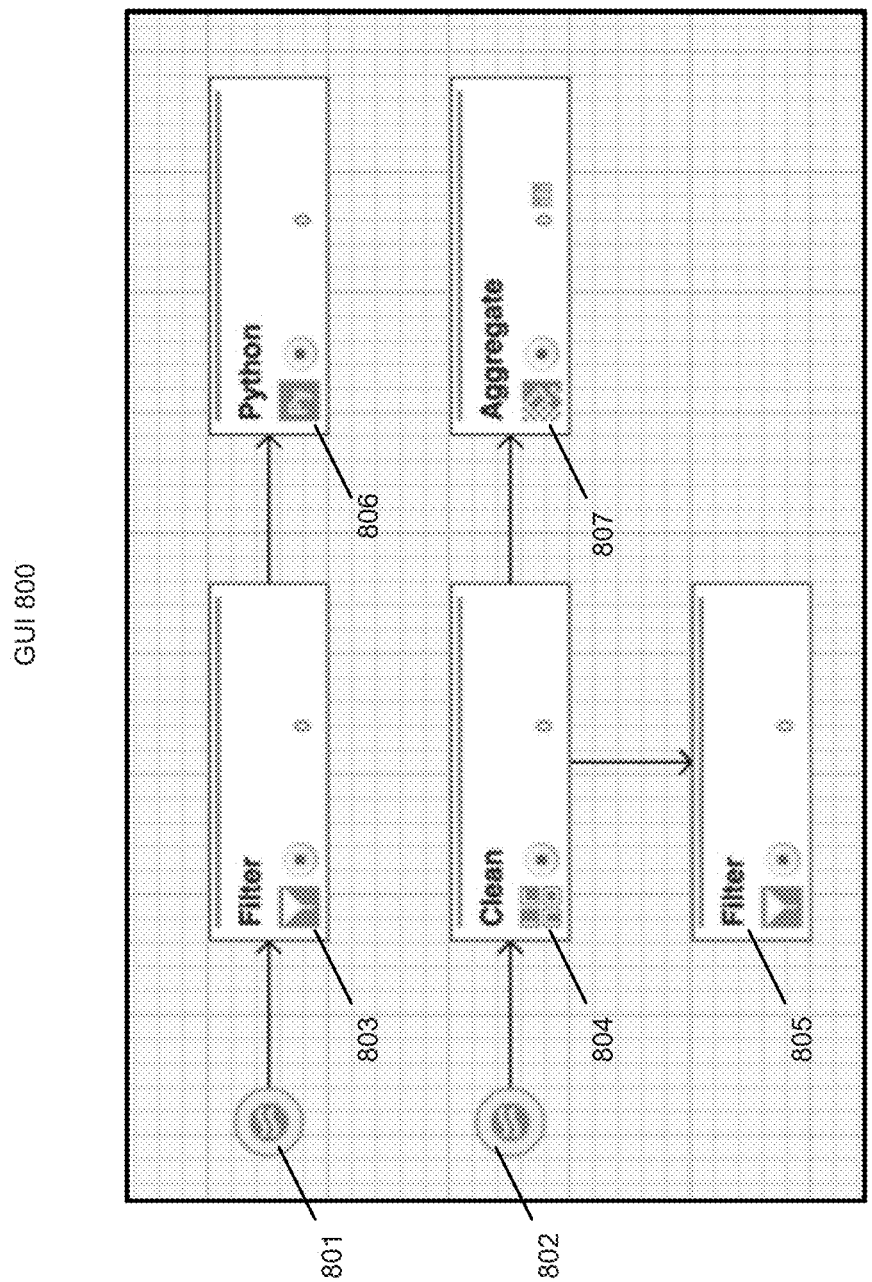
FIG. 8 depicts an example screen shot of an embodiment of a graphical interface that is adapted to display configurable components within a distributed data capture and processing system.

FIG. 8 depicts an example screen shot of an embodiment of a GUI 800 that is adapted to display configurable components within a distributed data capture and processing system. GUI 800 may be provided by a configuration server, such as configuration servers 120 of FIG. 1.

In the illustrated embodiment, GUI 800 includes two stream icons 801 and 802 that correspond to graphical representations of two event streams. Icon 801 is connected to a filter reactor icon 803 using a directed edge, which is further connected to a python reactor icon 806 using another directed edge. Filter reactor icon 803 may be a graphical representation of a filter reactor that filters event streams provided as input to the filter reactor according to one or more filtering rules (e.g., regular expressions, network data types, event types, time spans, etc.) and outputs the filtered event streams. Python reactor icon 806 may be a graphical representation of a python reactor that creates, processes, or stores events using the Python programming language. As a result, event data from the event stream represented by stream icon 801 may be filtered by the filter reactor before being processed by the python reactor.

Another series of directed edges in GUI 800 may connect stream icon 802 to a cleansing transformation reactor icon 804, which in turn is connected to both a filter reactor icon 805 and an aggregator reactor icon 807. Cleansing transformation reactor icon 804 may be a graphical representation of a cleansing transformation reactor that normalizes different representations of the same value into the same normalized value. For example, the cleansing transformation reactor may convert different timestamp formats into the same normalized timestamp format. Aggregator reactor icon 807 may be a graphical representation of an aggregator reactor that aggregates event data for multiple events received during a time interval and produces new events representing the aggregated information. The new events may include event counts, statistics, and/or uniqueness counts related to the aggregated information. For example, the aggregated event data may include total page views, average numbers of requests, minimum RTT, and/or counts of requests for uniquely named resources.

Other examples of reactors usable with the techniques described herein include:

Collection Reactors

LogInputReactor: Uses a Codec to store events into log files.
SnifferReactor: Passively sniffs network packets, reassembles TCP and decrypts SSL/TLS. Protocol plugins allow you to generate events from any type of network traffic.

Processing Reactors

AggregateReactor: Aggregates information across multiple events received during an interval of time. Produces new events representing the aggregated information. Can also store historical information into external database tables and produce real-time reports.
ClickstreamReactor: Sessionizes a stream of HTTP request events (or clickstream hits) by grouping them into page views and sessionizes. Appends additional session attributes to the request events and produces two new types of events, one each for page views and sessions.
ContentHashReactor: Performs a hashing algorithm on a content field and uses the result to populate field. This Reactor controls which content is stored in the Stream Replay database.
FilterReactor: Uses configurable rules to detect new events, sequences or patterns. Delivers events to the reactors it is connected to only when these occur.
FissionReactor: Used to generate multiple events derived from a single source event. Primarily used to extract RSS and Atom content from individual HTTP requests.
PythonReactor: The PythonReactor allows you to build fully-featured Reactors that can create, process, or store events using the Python programming language.
ScriptReactor: Executes a shell script to process each event it receives.
SessionFilterReactor: Uses rules to detect patterns within visitor sessions. Events for a session are queued in memory until a match is found. If a match is found, all the session's events are passed through as output to other Reactors. If no match is found, the events are discarded.
SQLReactor: Uses Database plugins to perform real-time SQL queries derived from the events that it receives.

The results of the queries can be used to add additional information to the original event.
TransformReactor: Creates new events which are derived from the events that it receives. This can be used to create entirely new types of complex events (for example, to signify that a pattern has been detected), or to derive new attributes which are based on attributes in existing events (i.e. assign a new attribute to "Internet Explorer" if an existing attribute contains "MSIE").

Storage Reactors

DatabaseOutputReactor: Stores events directly into database tables using Database plugins
GoogleAnalyticsReactor: Replicates website page tags by delivering real-time clickstream events to Google Analytics using their HTTP interface.
HTTPOutputReactor: Converts incoming events into HTTP requests.
LogOutputReactor: Uses a Codec to store events into log files.
MultiDatabaseReactor: Stores events into a collection of partitioned database tables. Used by Stream Replay to store traffic into an embedded database.
OmnitureAnalyticsReactor: Replicates website page tags by delivering real-time clickstream events to Omniture using their XML/HTTP data insertion API.
UnicaAnalyticsReactor: Replicates website page tags by delivering real-time clickstream events to Webtrends Analytics using their On Demand HTTP API.
WebtrendsReactors: Replicates website page tags by delivering real-time clickstream events to Webtrends Analytics using their On Demand HTTP API.

GUI 800 may thus provide a visual mechanism for configuring event streams that are generated from network traffic. Users may connect graphical representations of event streams and reactors to allow filtering, cleaning, aggregating, transforming, and/or other processing of events in the event streams. Output from the reactors may then be provided to other reactors using connections (e.g., directed edges) specified in GUI 800 for further processing.

Figure 9:
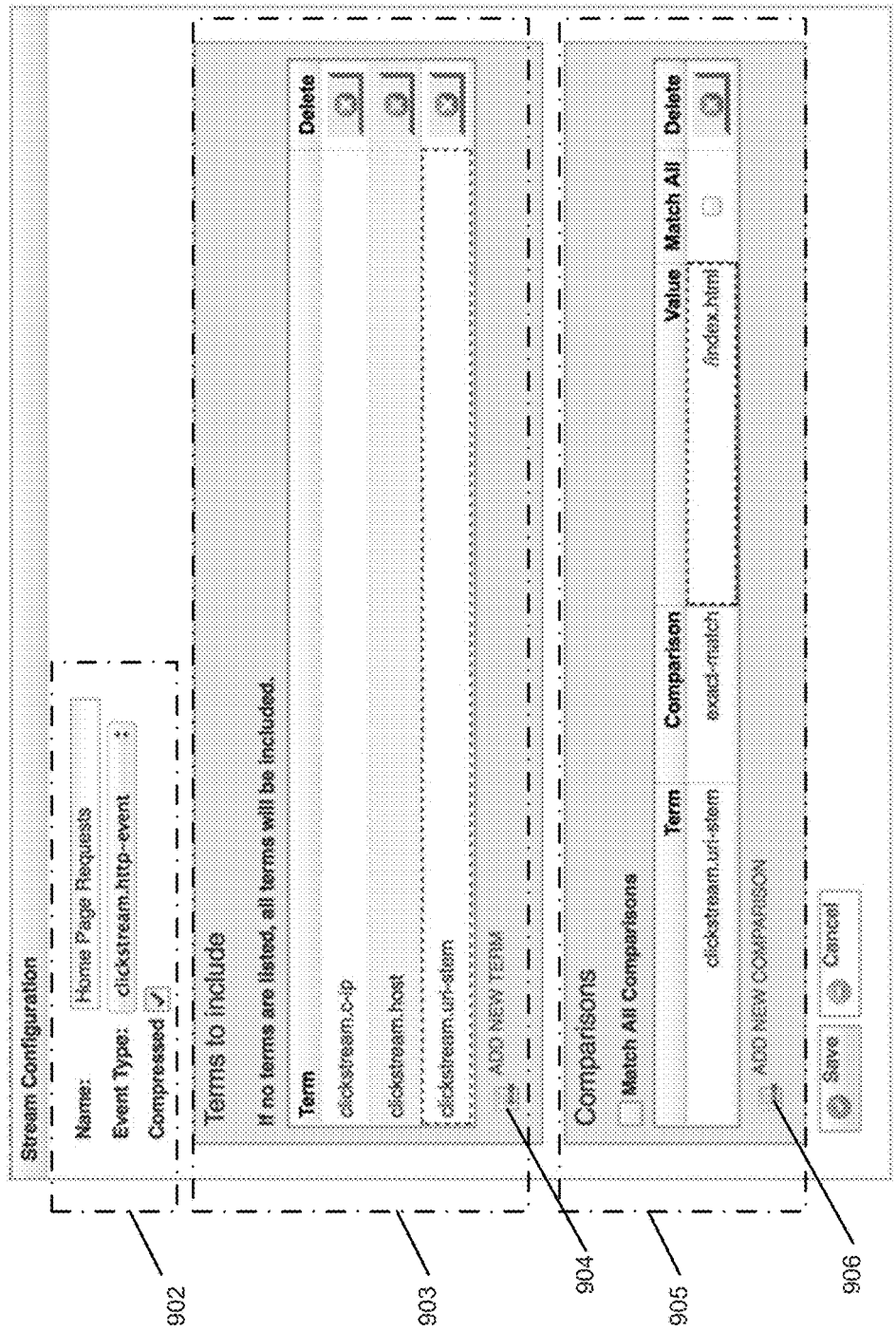
FIG. 9 depicts an example screen shot of an embodiment of a configuration dialog for obtaining configuration information for configuring the generation of event data from network data at one or more remote capture agents.

In addition, selecting (e.g., double-clicking) on stream icons 801-802 may invoke the configuration dialog for the corresponding event stream, which allows users to configure the generation of event data in the event stream. FIG. 9 depicts an example screen shot of an embodiment of a configuration dialog 901 for obtaining configuration information for configuring the generation of event data from network data at one or more remote capture agents.

In the illustrated embodiment, configuration dialog 901 includes a section 902 for specifying a descriptive stream name (e.g., "Home Page Requests") and an event type (e.g., "clickstream.http-event") associated with the event stream. Another section 903 may be used to provide terms (e.g., for clickstream data) to be included in event data the event stream. For example, section 903 may display a list of terms (e.g., "clickestream.c-ip," "clickstream.host," "clickstream.uri-stem") to be included in the event data, as well as a mechanism 904 for adding a new term to the list.

Configuration dialog 901 further includes a section 905 that enables the definition of one or more filtering rules. For example, section 905 may include a filtering rule that requires an exact match between a URI stem of an event and the value "/index.html." Section 905 may also include a mechanism 906 for adding new filtering rules for the event stream.

4.0. Implementation Mechanisms

4.1. Exemplary Systems for Storing and Retrieving Events

Figure 10:
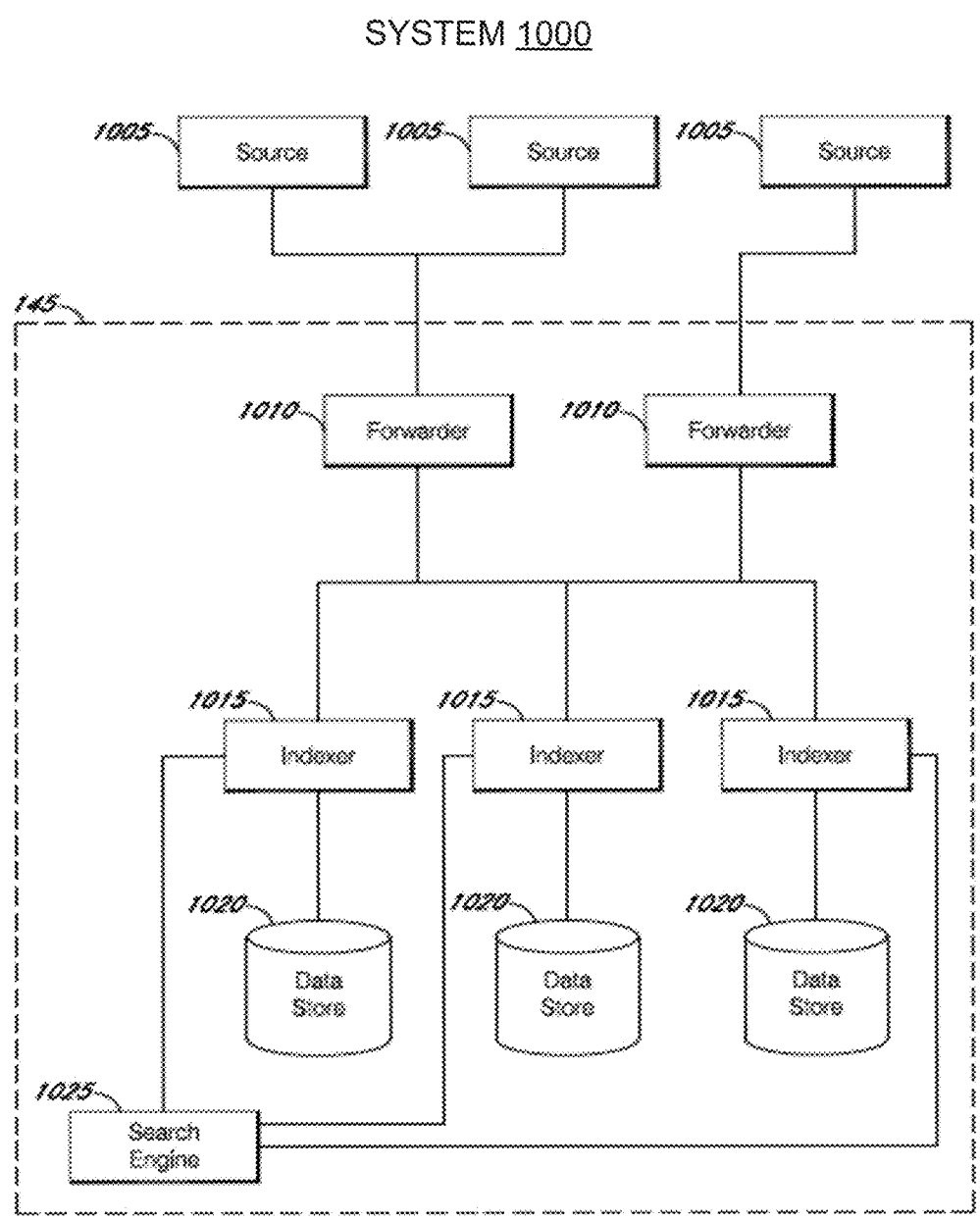
FIG. 10 depicts an example block diagram of an embodiment of a time-based data storage architecture that includes a late-binding schema.

As noted above, the visualization techniques described herein can be applied to a variety of types of events, including those generated and used in SPLUNK® ENTERPRISE. Further details of underlying architecture of SPLUNK® ENTERPRISE are now provided. FIG. 10 depicts an example block diagram of an embodiment of a time-based data storage architecture that includes a late-binding schema.

Generally, the system includes one or more forwarders 1010 that collect data from a variety of different data sources 1005 and forwards the data using forwarders 1010 to one or more data indexers 1015. In one embodiment, forwarders 1010 and indexers 1015 can be implemented in one or more hardware servers. Moreover, the functionality of one or more forwarders 1010 may be implemented by one or more remote capture agents (e.g., remote capture agents 151-153 of FIG. 1) and/or transformation servers. For example, event data from a set of remote capture agents may be sent over a network to a set of transformation servers and/or reactors (e.g., collection reactors, processing reactors, storage reactors) that implement the indexing, storage and querying functionality of SPLUNK® ENTERPRISE. The data typically includes streams of time-series data. Time-series data refers to any data that can be associated with a time stamp. The data can be structured, unstructured, or semi-structured and come from files or directories. Unstructured data may be data that is not organized to facilitate extraction of values for fields from the data, as is often the case with machine data and web logs. The data indexers 1015 may provide the time-stamped data for storage in one or more data stores 1020.

Figure 11:
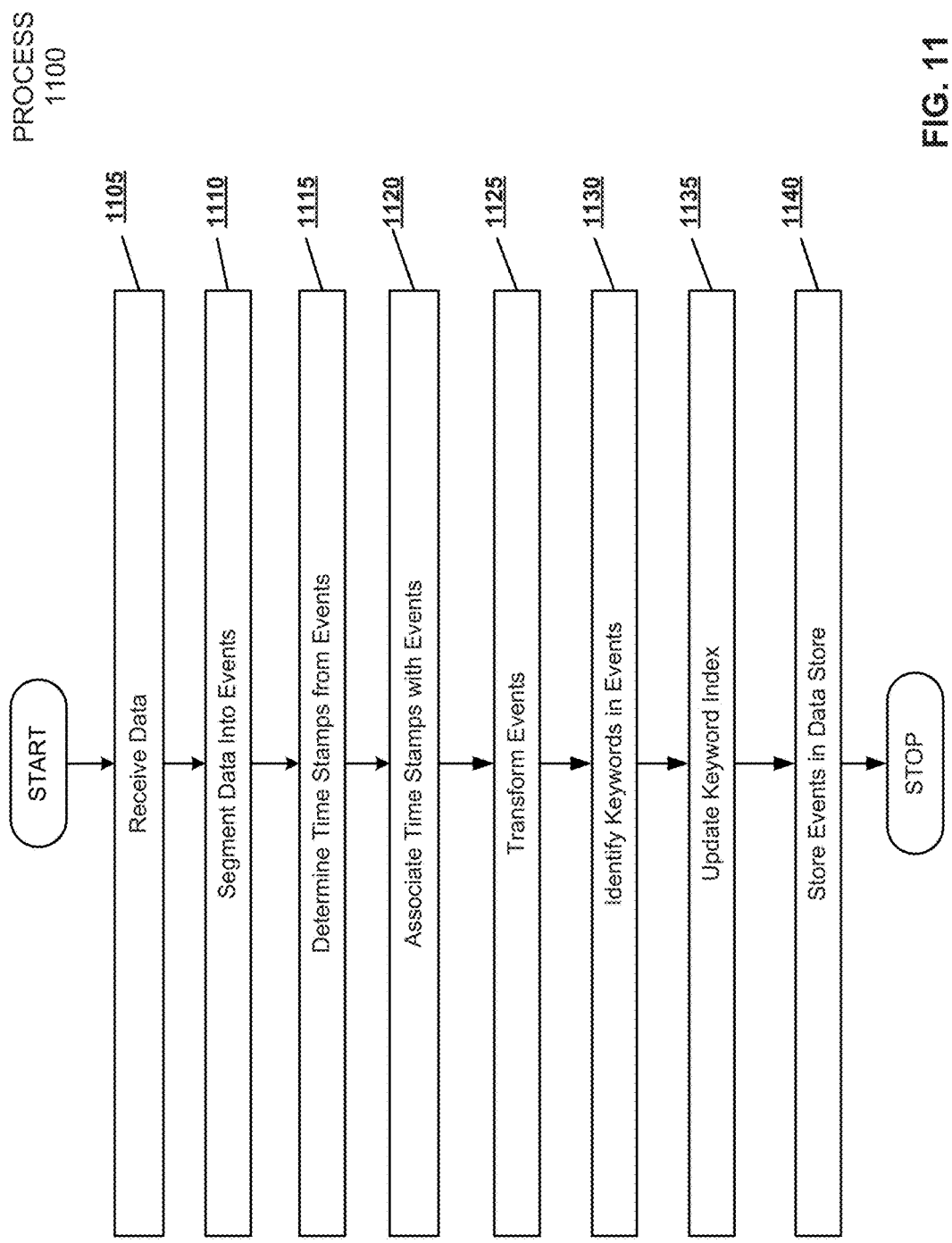
FIG. 11 illustrates a flowchart of an example embodiment of a process for storing collected data in a data storage architecture that includes a late-binding schema.

FIG. 11 illustrates a flowchart of an example embodiment of a process for storing collected data in a data storage architecture that includes a late-binding schema. FIG. 11 depicts a process that indexers 1015 may use to process, index, and store data received from the forwarders 1010. At operation 1105, an indexer 1015 receives data from a forwarder 1010. At operation 1110, the data is segmented into events. The events can be broken at event boundaries, which can include character combinations and/or line breaks. In some instances, the software discovers event boundaries automatically, and in other instances the event boundaries may be configured by the user. A time stamp is determined for each event at operation 1115. The time stamp can be determined by extracting the time from data in an event or by interpolating the time based on time stamps from other events. In alternative embodiments, a time stamp may be determined from the time the data was received or generated. The time stamp is associated with each event at operation 1120. For example, the time stamp may be stored as metadata for the event.

At operation 1125, the data included in a given event may be transformed. Such a transformation can include such things as removing part of an event (e.g., a portion used to define event boundaries) or removing redundant portions of an event. A client data processing system may specify a portion to remove using a regular expression or any similar method.

Optionally, a keyword index can be built to facilitate fast keyword searching of events. To build such an index, in operation 1130, a set of keywords contained in the events is identified. At operation 1135, each identified keyword is included in an index, which associates with each stored keyword pointers to each event containing that keyword (or locations within events where that keyword is found). When a keyword-based query is received by an indexer, the indexer may then consult this index to quickly find those events containing the keyword without having to examine again each individual event, thereby greatly accelerating keyword searches.

The events are stored in a data store at operation 1140. The data can be stored in working, short-term and/or long-term memory in a manner retrievable by query. The time stamp may be stored along with each event to help optimize searching the events by time range.

In some instances, the data store includes a plurality of individual storage buckets, each corresponding to a time range. An event can then be stored in a bucket associated with a time range inclusive of the event's time stamp. This not only optimizes time based searches, but it can allow events with recent time stamps that may have a higher likelihood of being accessed to be stored at preferable memory locations that lend to quicker subsequent retrieval (such as flash memory instead of hard-drive memory).

As shown in FIG. 10, data stores 1020 may be distributed across multiple indexers, each responsible for storing and searching a subset of the events generated by the system. By distributing the time-based buckets among them, the indexers may find events responsive to a query from a search engine 1025 in parallel using map-reduce techniques, each returning their partial responses to the query to a search head that combines the results together to answer the query. This query handling is illustrated in FIG. 12.

Figure 12:
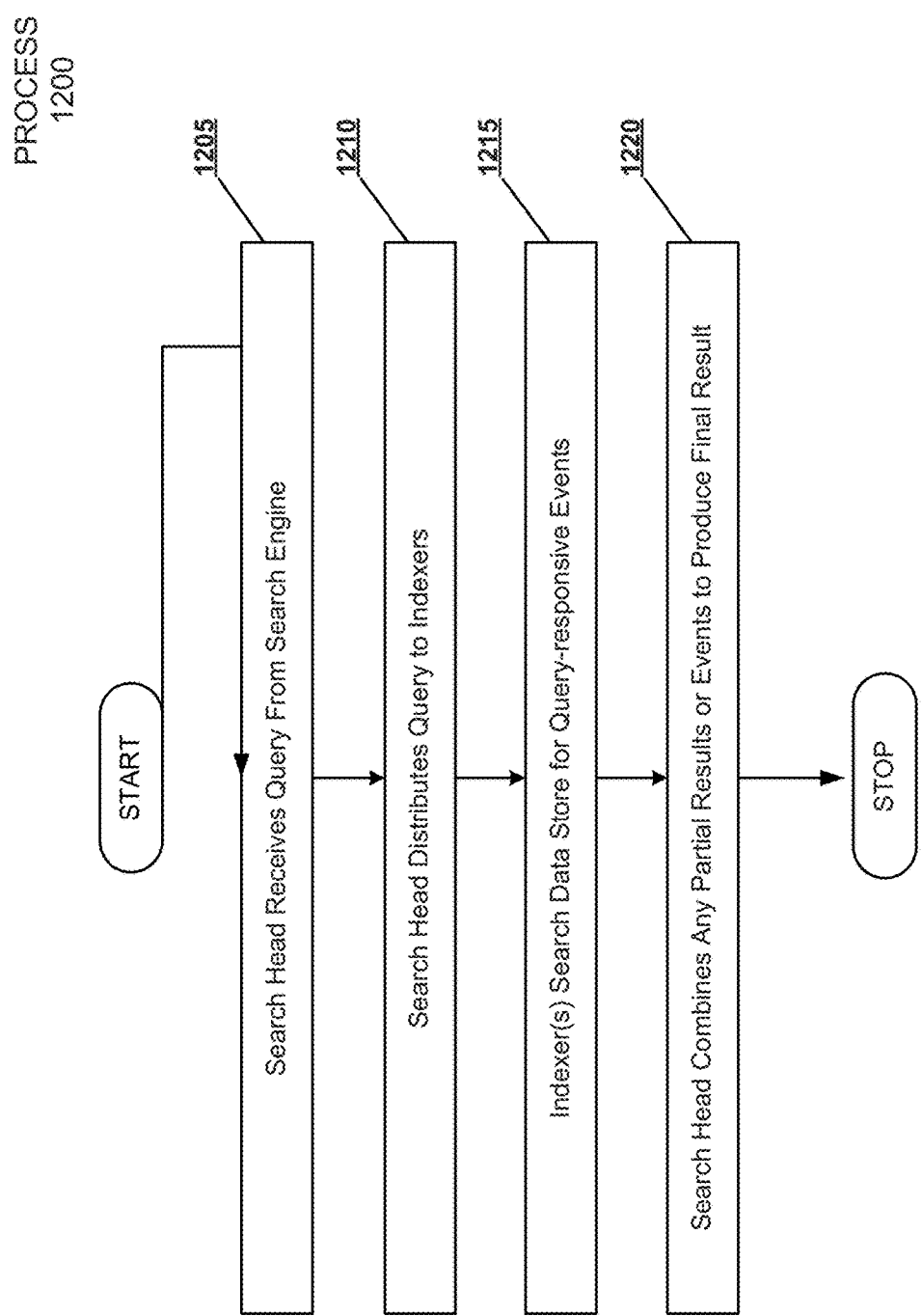
FIG. 12 illustrates a flowchart of an example embodiment of a process for generating a query result in a data storage architecture that includes a late-binding schema.

FIG. 12 illustrates a flowchart of an example embodiment of a process for generating a query result in a data storage architecture that includes a late-binding schema. At operation 1205, a search heard receives a query from a search engine. At operation 1210, the search head distributes the query to one or more distributed indexers. These indexers can include those with access to data stores having events responsive to the query. For example, the indexers can include those with access to events with time stamps within part or all of a time period identified in the query. At operation 1215, each of one or more indexers to which the query was distributed searches its data store for events responsive to the query. To determine events responsive to the query, a searching indexer finds events specified by the criteria in the query. This criteria can include that the events have particular keywords or contain a specified value or values for a specified field or fields (because this employs a late-binding schema, extraction of values from events to determine those that meet the specified criteria occurs at the time this query is processed).

It should be appreciated that, to achieve high availability and to provide for disaster recovery, events may be replicated in multiple data stores, in which case indexers with access to the redundant events would not respond to the query by processing the redundant events. The indexers 1015 may either stream the relevant events back to the search head or use the events to calculate a partial result responsive to the query and send the partial result back to the search head. At operation 1220, the search head combines all the partial results or events received from the parallel processing together to determine a final result responsive to the query.

Data intake and query system 145 and the processes described with respect to FIGS. 10-12 are further discussed and elaborated upon in Carasso, David. *Exploring Splunk Search Processing Language (SPL) Primer and Cookbook*. New York: CITO Research, 2012 and in Ledion Bitincka, Archana Ganapathi, Stephen Sorkin, and Steve Zhang. *Opti-*

*mizing data analysis with a semi-structured time series database.* In SLAML, 2010. Each of these references is hereby incorporated by reference in its entirety for all purposes.

4.2. Hardware Overview

Figure 13:
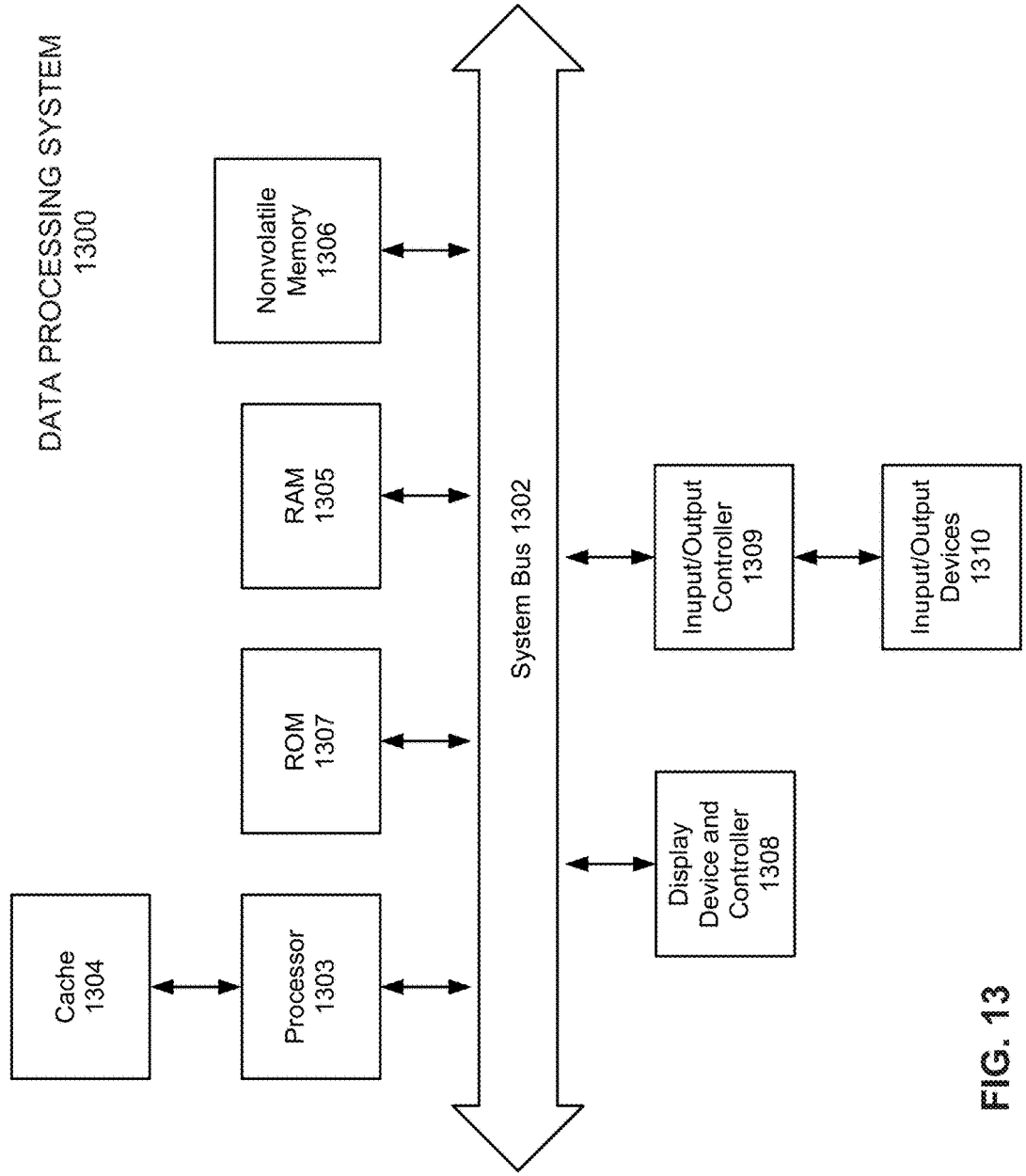
FIG. 13 depicts an example data processing system upon which the embodiments described herein may be implemented.

FIG. 13 depicts an example data processing system upon which the embodiments described herein may be implemented. As shown in FIG. 13, the data processing system 1301 includes a system bus 1302, which is coupled to a processor 1303, a Read-Only Memory ("ROM") 1307, a Random Access Memory ("RAM") 1305, as well as other nonvolatile memory 1306, e.g., a hard drive. In the illustrated embodiment, processor 1303 is coupled to a cache memory 1304. System bus 1302 can be adapted to interconnect these various components together and also interconnect components 1303, 1307, 1305, and 1306 to a display controller and display device 1308, and to peripheral devices such as input/output ("I/O") devices 1310. Types of I/O devices can include keyboards, modems, network interfaces, printers, scanners, video cameras, or other devices well known in the art. Typically, I/O devices 1310 are coupled to the system bus 1302 through I/O controllers 1309. In one embodiment the I/O controller 1309 includes a Universal Serial Bus ("USB") adapter for controlling USB peripherals or other type of bus adapter.

RAM 1305 can be implemented as dynamic RAM ("DRAM"), which requires power continually in order to refresh or maintain the data in the memory. The other nonvolatile memory 1306 can be a magnetic hard drive, magnetic optical drive, optical drive, DVD RAM, or other type of memory system that maintains data after power is removed from the system. While FIG. 13 shows that nonvolatile memory 1306 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

5.0. Extensions and Alternatives

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory. In various embodiments, hardwired circuitry may be used independently or in combination with software instructions to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be implemented in computer-readable instructions stored on an article of manufacture referred to as a computer-readable medium, which is adapted to store data that can thereafter be read and processed by a computer. Computer-readable media is adapted to store these computer instructions, which when executed by a computer or other data processing system such as data processing system 1300, are adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing instructions in an electronic format. Computer-readable media can also be distributed over a network-coupled computer system stored and executed in a distributed fashion.

Throughout the foregoing description, for the purposes of explanation, numerous specific details were set forth in order to provide a thorough understanding of the invention. It will be apparent, however, to persons skilled in the art that these embodiments may be practiced without some of these specific details. Although various embodiments incorporating the teachings of the present invention have been shown and described in detail herein, those skilled in the art can readily devise many other varied embodiments that still incorporate these techniques. Embodiments of the invention may include various operations as set forth above or fewer operations or more operations; or operations in an order, which is different from the order described herein. Accordingly, the scope and spirit of the invention should be judged in terms of the claims that follow as well as the legal equivalents thereof.

What is claimed is:

1. A computer-implemented method performed by a configuration server coupled to a network, the method comprising:

obtaining configuration information generated and sent to the configuration server by an application running on a server that is separate from the configuration server and that is coupled to the configuration server via the network, the configuration information specifying one or more event streams to be generated by one or more remote capture agents, the one or more event streams including timestamped event data generated by the one or more remote capture agents based on network traffic monitored by the one or more remote capture agents, and wherein the one or more remote capture agents are installed in a virtual computing environment; and sending the configuration information to the one or more remote capture agents, the configuration information causing the one or more remote capture agents to:

generate the one or more event streams including timestamped event data generated based on network traffic monitored by the one or more remote capture agents, and send the one or more event streams to another component on the network for storage in a data store accessible to the application.

2. The computer-implemented method of claim 1, wherein the configuration information causes the one or more remote capture agents to generate each event of the timestamped event data by:

identifying boundaries of the event in the network traffic;

extracting network packet data from at least one network packet of the network traffic and associating the network packet data with the event;

determining a timestamp associated with the event; and
associating the timestamp with the event.

3. The computer-implemented method of claim 1, wherein the configuration information further causes the one or more remote capture agents to generate each event of the timestamped event data by:
  extracting network packet data from at least one network packet of the network traffic and associating the network packet data with the event;
  applying a filtering rule to the network packet data to determine an event type associated with the event; and
  adding, based on the determined event type, the event to at least one event stream of one or more event streams.

4. The computer-implemented method of claim 1, wherein the application uses the one or more event streams to satisfy search requests for data contained in the one or more event streams.

5. The computer-implemented method of claim 1, wherein the application uses the one or more event streams to generate visualizations based on timestamped event data contained in the one or more event streams.

6. The computer-implemented method of claim 1, wherein the configuration information specifies one or more transformations to be applied to the timestamped event data, and wherein the one or more transformations comprise at least one of an aggregation, a calculation, a filter, a normalization, and a formatting.

7. The computer-implemented method of claim 1, wherein the configuration information comprises at least one of an identifier for an event stream, a description for the event stream, an event stream type for the event stream, a custom field for the event stream, and an additional parameter for the event stream.

8. The computer-implemented method of claim 1, wherein the configuration information comprises an additional parameter, and wherein the additional parameter is at least one of a time interval between events, a maximum number of aggregated events, and an inclusion of a matching transaction or matching error in the event data.

9. A configuration server coupled to a network, the configuration server comprising:
  a processor;
  a non-transitory computer readable storage medium storing instructions which, when executed by the processor, cause the configuration server to:
    obtain configuration information generated and sent to the configuration server by an application running on a server that is separate from the configuration server and that is coupled to the configuration server via the network, the configuration information specifying one or more event streams to be generated by one or more remote capture agents, the one or more event streams including timestamped event data generated by the one or more remote capture agents based on network traffic monitored by the one or more remote capture agents, and wherein the one or more remote capture agents are installed in a virtual computing environment; and
    send the configuration information to the one or more remote capture agents, the configuration information causing the one or more remote capture agents to:
      generate the one or more event streams including timestamped event data generated based on network traffic monitored by the one or more remote capture agents, and
      send the one or more event streams to another component on the network for storage in a data store accessible to the application.

10. The configuration server of claim 9, wherein the configuration information further causes the one or more remote capture agents to generate each even of the timestamped event data by:
  identifying boundaries of the event in the network traffic;
  extracting network packet data from at least one network packet of the network traffic and associating the network packet data with the event;
  determining a timestamp associated with the event; and
  associating the timestamp with the event.

11. The configuration server of claim 9, wherein the configuration information further causes the one or more remote capture agents to generate each event of the timestamped event data by:
  extracting network packet data from at least one network packet of the network traffic and associating the network packet data with the event;
  applying a filtering rule to the network packet data to determine an event type associated with the event; and
  adding, based on the determined event type, the event to at least one event stream of one or more event streams.

12. The configuration server of claim 9, wherein the application uses the one or more event streams to satisfy search requests for data contained in the one or more event streams.

13. The configuration server of claim 9, wherein the application uses the one or more event streams to generate visualizations based on timestamped event data contained in the one or more event streams.

14. The configuration server of claim 9, wherein the configuration information specifies one or more transformations to be applied to the timestamped event data, and wherein the one or more transformations comprise at least one of an aggregation, a calculation, a filter, a normalization, and a formatting.

15. The configuration server of claim 9, wherein the configuration information comprises at least one of an identifier for an event stream, a description for the event stream, an event stream type for the event stream, a custom field for the event stream, and an additional parameter for the event stream.

16. The configuration server of claim 9, wherein the configuration information comprises an additional parameter, and wherein the additional parameter is at least one of a time interval between events, a maximum number of aggregated events, and an inclusion of a matching transaction or matching error in the event data.

17. A non-transitory computer-readable storage medium storing instructions that when executed by a computer cause a configuration server to perform operations comprising:
  obtaining configuration information generated and sent to the configuration server by an application running on a server that is separate from the configuration server and that is coupled to the configuration server via the network, the configuration information specifying one or more event streams to be generated by one or more remote capture agents, the one or more event streams including timestamped event data generated by the one or more remote capture agents based on network traffic monitored by the one or more remote capture agents, and wherein the one or more remote capture agents are installed in a virtual computing environment; and sending the configuration information to the one or more remote capture agents, the configuration information causing the one or more remote capture agents to:
generate the one or more event streams including timestamped event data generated based on network traffic monitored by the one or more remote capture agents, and
send the one or more event streams to another component on the network for storage in a data store accessible to the application.

18. The non-transitory computer-readable storage medium of claim 17, wherein the configuration information causes the one or more remote capture agents to generate each event of the timestamped event data by:
identifying boundaries of the event in the network traffic;
extracting network packet data from at least one network packet of the network traffic and associating the network packet data with the event;
determining a timestamp associated with the event; and
associating the timestamp with the event.

19. The non-transitory computer-readable storage medium of claim 17, wherein the configuration information further causes the one or more remote capture agents to generate each event of the timestamped event data by:
extracting network packet data from at least one network packet of the network traffic and associating the network packet data with the event;
applying a filtering rule to the network packet data to determine an event type associated with the event; and
adding, based on the determined event type, the event to at least one event stream of one or more event streams.

20. The non-transitory computer-readable storage medium of claim 17, wherein the application uses the one or more event streams to satisfy search requests for data contained in the one or more event streams.

21. The non-transitory computer-readable storage medium of claim 17, wherein the application uses the one or more event streams to generate visualizations based on timestamped event data contained in the one or more event streams.

22. The non-transitory computer-readable storage medium of claim 17, wherein the configuration information specifies one or more transformations to be applied to the timestamped event data, and wherein the one or more transformations comprise at least one of an aggregation, a calculation, a filter, a normalization, and a formatting.

23. The non-transitory computer-readable storage medium of claim 17, wherein the configuration information comprises at least one of an identifier for an event stream, a description for the event stream, an event stream type for the event stream, a custom field for the event stream, and an additional parameter for the event stream.

24. The non-transitory computer-readable storage medium of claim 17, wherein the configuration information comprises an additional parameter, and wherein the additional parameter is at least one of a time interval between events, a maximum number of aggregated events, and an inclusion of a matching transaction or matching error in the event data.

* * * * *